United States Patent
Qiao et al.

(10) Patent No.: US 11,463,917 B2
(45) Date of Patent: Oct. 4, 2022

(54) MONITORING AND REPORTING QUALITY OF SERVICE OCCURRENCES IN A WIRELESS NETWORK

(71) Applicant: Samsung Electronics Co., Ltd., Suwon-si (KR)

(72) Inventors: Weihua Qiao, Herndon, VA (US); Esmael Dinan, McLean, VA (US); Kyungmin Park, Herndon, VA (US); Peyman Talebi Fard, Sterling, VA (US)

(73) Assignee: Samsung Electronics Co., Ltd., Suwon-si (KR)

(*) Notice: Subject to any disclaimer, the term of this patent is extended or adjusted under 35 U.S.C. 154(b) by 216 days.

(21) Appl. No.: 16/999,620

(22) Filed: Aug. 21, 2020

(65) Prior Publication Data

US 2020/0404547 A1    Dec. 24, 2020

Related U.S. Application Data

(63) Continuation of application No. 16/225,173, filed on Dec. 19, 2018, now Pat. No. 10,757,609.

(Continued)

(51) Int. Cl.
| | |
|---|---|
| H04W 28/24 | (2009.01) |
| H04L 43/087 | (2022.01) |
| H04W 24/06 | (2009.01) |
| H04W 28/02 | (2009.01) |
| H04W 24/08 | (2009.01) |
| H04W 24/10 | (2009.01) |

(Continued)

(52) U.S. Cl.
CPC .......... *H04W 28/24* (2013.01); *H04L 43/087* (2013.01); *H04W 24/06* (2013.01); *H04W 24/10* (2013.01); *H04W 28/0268* (2013.01); *H04W 60/00* (2013.01); *H04W 60/06* (2013.01); *H04W 24/08* (2013.01); *H04W 48/18* (2013.01)

(58) Field of Classification Search
CPC  H04L 43/087; H04W 24/06; H04W 28/0268; H04W 24/08
See application file for complete search history.

(56) References Cited

U.S. PATENT DOCUMENTS

| | | |
|---|---|---|
| 8,102,877 B1 | 1/2012 | Liu et al. |
| 2005/0163047 A1* | 7/2005 | McGregor ............ H04W 24/00 370/229 |

(Continued)

OTHER PUBLICATIONS

3GPP TS 22.261 V16.0.0 (Jun. 2017); Technical Specification; 3rd Generation Partnership Project; Technical Specification Group Services and System Aspects; Service requirements for the 5G system; Stage 1; (Release 16).

(Continued)

*Primary Examiner* — Ayanah S George
(74) *Attorney, Agent, or Firm* — Jefferson IP Law, LLP

(57) ABSTRACT

A user plane function receives, from a session management function, a request for at least one quality of service (QoS) report for a data flow, the request indicating: a QoS event; and a first QoS value for the QoS event. Monitoring packets for monitoring a second QoS value of the data flow are sent to a base station. A determination is made of an occurrence of the QoS event based on the second QoS value and the first QoS value. An indication of the occurrence is sent to the session management function.

20 Claims, 23 Drawing Sheets

Related U.S. Application Data

(60) Provisional application No. 62/617,498, filed on Jan. 15, 2018, provisional application No. 62/616,389, filed on Jan. 11, 2018.

(51) Int. Cl.
    *H04W 60/06*    (2009.01)
    *H04W 60/00*    (2009.01)
    *H04W 48/18*    (2009.01)

(56) References Cited

U.S. PATENT DOCUMENTS

| | | |
|---|---|---|
| 2012/0221955 A1 | 8/2012 | Raleigh et al. |
| 2020/0374742 A1 | 11/2020 | Chong et al. |
| 2021/0014722 A1 | 1/2021 | Han et al. |
| 2021/0037411 A1 | 2/2021 | Ueda |

OTHER PUBLICATIONS

3GPP TS 23.203 V14.4.0 (Jun. 2017); Technical Specification; 3rd Generation Partnership Project; Technical Specification Group Services and System Aspects; Policy and charging control architecture (Release 14).

3GPP TS 23.501 V1.0.0 (Jun. 2017); Technical Specification; 3rd Generation Partnership Project; Technical Specification Group Services and System Aspects; System Architecture for the 5G System; Stage 2; (Release 15).

3GPP TS 23.502 V0.5.0 (Jul. 2017); Technical Specification; 3rd Generation Partnership Project; Technical Specification Group Services and System Aspects; Procedures for the 5G System; Stage 2; (Release 15).

3GPP TS 23.503 V15.0.0 (Dec. 2017); 3rd Generation Partnership Project; Technical Specification Group Services and System Aspects; Policy and Charging Control Framework for the 5G System; Stage 2 (Release 15).

3GPP TS 29.155 V14.2.0 (Jun. 2017); Technical Specification; 3rd Generation Partnership Project; Technical Specification Group Core Network and Terminals; Traffic steering control; Representational state transfer (REST) over St reference point; (Release 14).

3GPP TS 29.201 V14.0.0 (Dec. 2016); 3rd Generation Partnership Project; Technical Specification Group Core Network and Terminals; Representational State Transfer (REST) reference point between Application Function (AF) and Protocol Converter (PC) (Release 14).

3GPP TS 29.212 V14.4.0 (Jun. 2017); 3rd Generation Project; Technical Specification Group Core Network and Terminals; Policy and Changing Control (PCC); Reference points (Release 14).

3GPP TS 29.214 V.15.0.0 (Jun. 2017); 3rd Generation Partnership Project; Technical Specification Group Core Network and Terminals' Policy and Changing Control over Rx reference point (Release 15).

3GPP TS 29.500 V0.0.0 (Dec. 2017); 3rd Generation Partnership Project; Technical Specification Group Core Network and Terminals 5G System; Technical Realization of Service Based Architecture; Stage 3 (Release 15).

Jitter; Understanding Jitter; Cisco Networking Academy Program; IP Telephony v1.0.

3GPP TSG-SA WG1 #80 S1-174059; Reno, NV, USA Nov. 27-Dec. 1, 2017 (revision of S1-17xxxx); Title: Discussion on QoS perception; Agenda Item: 5; Source: Huawei, China Mobile.

U.S. Office Action dated Jan. 10, 2022, issued in U.S. Appl. No. 17/106,957.

* cited by examiner

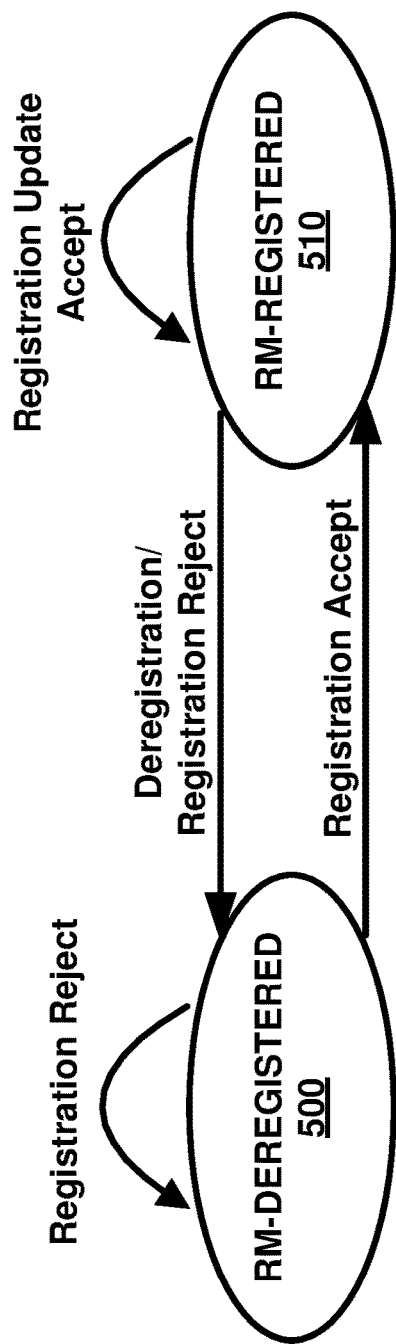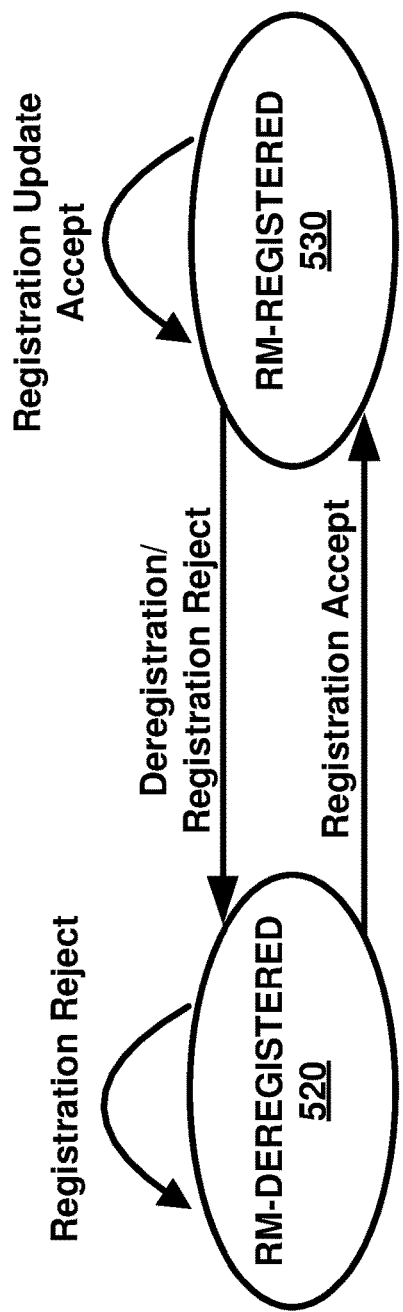

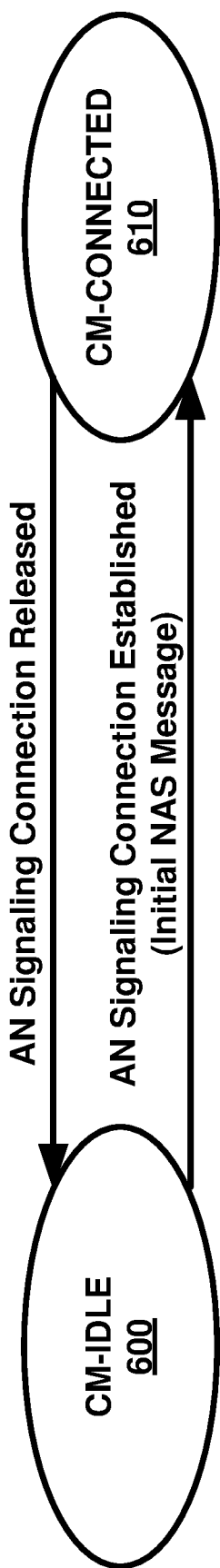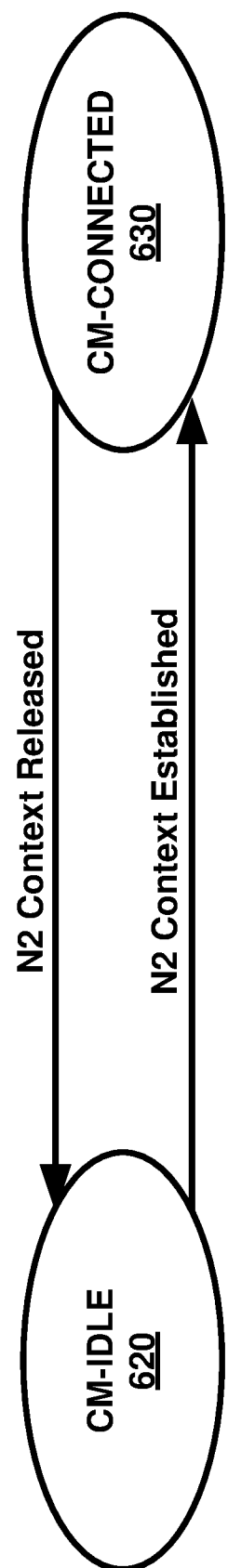
FIG. 6A — CM State Transition in UE
FIG. 6B — CM State Transition in AMF

| Scenario | End-to-end latency | Jitter | Survival time | Communication service availability | Reliability | User experienced data rate | Payload size | Traffic density | Connection density | Service area dimension |
|---|---|---|---|---|---|---|---|---|---|---|
| Discrete automation – motion control | 1 ms | 1 μs | 0 ms | 99,9999% | 99,9999% | 1 Mbps up to 10 Mbps | Small | 1 Tbps/km² | 100 000 /km² | 100 x 100 x 30 m |
| Discrete automation | 10 ms | 100 μs | 0 ms | 99,99% | 99,99% | 10 Mbps | Small to big | 1 Tbps/km² | 100 000 /km² | 1000 x 1000 x 30 m |
| Process automation – remote control | 50 ms | 20 ms | 100 ms | 99,9999% | 99,9999% | 1 to 100 Mbps | Small to big | 100 Gbps/km² | 1 000 /km² | 300 x 300 x 50 m |
| Process automation – monitoring | 50 ms | 20 ms | 100 ms | 99,9% | 99,9% | 1 Mbps | Small | 10 Gbps/km² | 10 000 /km² | 300 x 300 x 50 |
| Electricity distribution – medium voltage | 25 ms | 25 ms | 25 ms | 99,9% | 99,9% | 10 Mbps | Small to big | 10 Gbps/km² | 1 000 /km² | 100 km along power line |
| Electricity distribution – high voltage | 5 ms | 1 ms | 10 ms | 99,9999% | 99,9999% | 10 Mbps | Small | 100 Gbps/km² | 1 000 /km² | 200 km along power line |
| Intelligent transport systems | 10 ms | 20 ms | 100 ms | 99,9999% | 99,9999% | 10 Mbps | Small to big | 10 Gbps/km² | 1 000 /km² | 2 km along a road |
| Tactile interaction | 0,5 ms | TBC | TBC | [99,999%] | [99,999%] | [Low] | Small | [Low] | [Low] | TBC |

FIG. 14

Receive, by a UPF from a SMF, a 1st message requesting QoS report(s) for a data flow of a wireless device, the 1st message comprising: a 1st information element indicating a QoS event; and a 2nd information element indicating a latency value for the QoS event
1910

Send, by a UPF to the wireless device, monitoring packets for monitoring a packet transmission latency of the data flow
1920

Determine, by the UPF, an occurrence of the QoS event based on the packet transmission latency of the data flow and the latency value
1930

Send, by the UPF to the SMF, a 2nd message comprising a 3rd information element indicating the occurrence of the QoS event for the data flow
1940

FIG. 19

MONITORING AND REPORTING QUALITY OF SERVICE OCCURRENCES IN A WIRELESS NETWORK

CROSS-REFERENCE TO RELATED APPLICATIONS

This application is a continuation of U.S. patent application Ser. No. 16/225,173, filed Dec. 19, 2018, which claims the benefit of U.S. Provisional Application No. 62/616,389, filed Jan. 11, 2018, and the benefit of U.S. Provisional Application No. 62/617,498, filed Jan. 15, 2018, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 14 is an example table depicting performance requirements for low latency and high reliability services as per an aspect of an embodiment of the present disclosure.

FIG. 19 is an example flow diagram as per an aspect of an embodiment of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to monitoring and reporting service performance and/or QoS, and the embodiments of the technology disclosed herein may relate to roaming scenarios for monitoring and reporting service performance and/or QoS. Throughout the present disclosure, UE, wireless device, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 1:
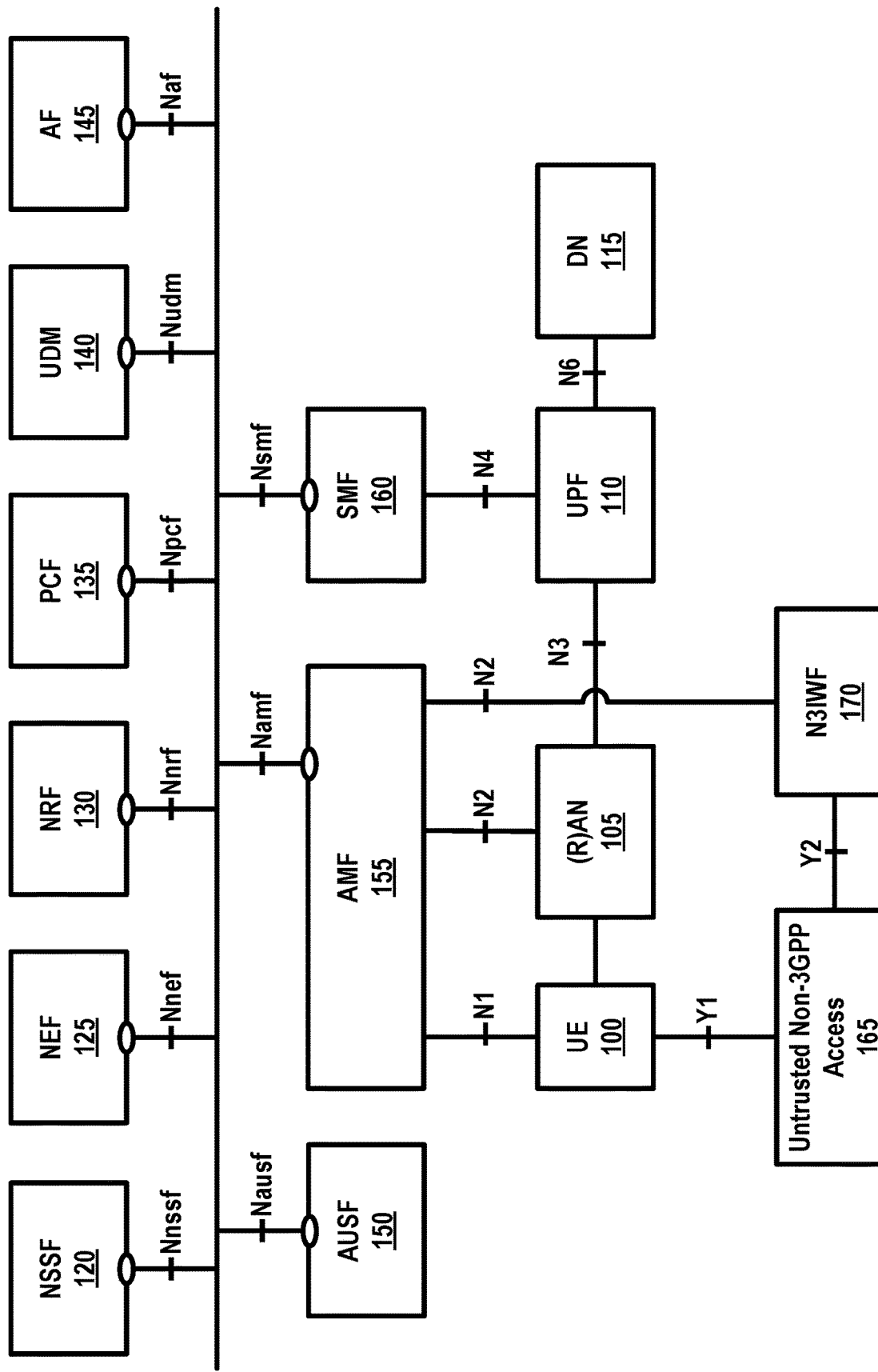
FIG. 1 is a diagram of an example 5G system architecture as per an aspect of an embodiment of the present disclosure.
Figure 2:
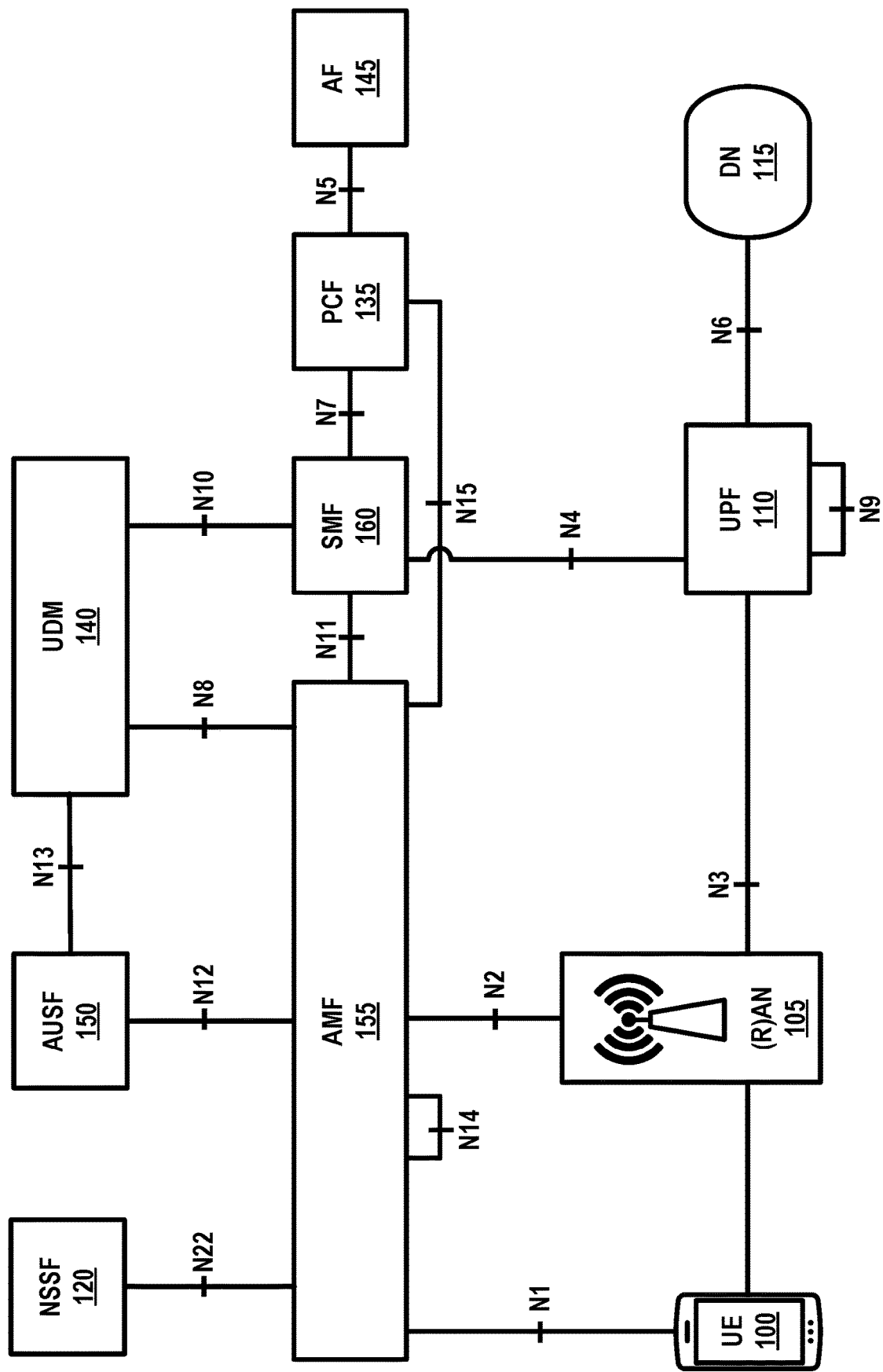
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMBR Aggregate Maximum Bit Rate
AMF Access and Mobility Management Function
AN Access Network
APN Access Point Name
ARP Allocation and Retention Priority
CCNF Common Control Network Functions
CN Core Network
CP Control Plane
DPI Deep Packet Inspection
DL Downlink
DN Data Network
DN-AAA Data Network Authentication Authorization and Accounting
DNN Data Network Name
gNB NR NodeB
GW Gateway
HSS Home Subscriber Server
IETF Internet Engineering Task Force
IP Internet Protocol
IP-CAN IP Connectivity Access Network
L2 Layer 2 (data link layer)
L3 Layer 3 (network layer)
LADN Local Area Data Network
MICO Mobile Initiated Connection Only
N3IWF Non-3GPP InterWorking Function
NAI Network Access Identifier
NAS Non Access Stratum
NEF Network Exposure Function
NF Network Function
NR New Radio
NG-RAN NR Radio Access Network
NRF Network Repository Function
NSI Network Slice Instance
NSSAI Network Slice Selection Assistance Information
NSSF Network Slice Selection Function
PCC Policy and Charging Control
PCF Policy Control Function
PDCP Packet Data Convergence Protocol PDN Packet Data Network
PDU Packet Data Unit
PEI Permanent Equipment Identifier
RAN Radio Access Network
RB Radio Bearer
RFC Request For Comments
RLC Radio Link Control
RRC Radio Resource Control
RM Registration Management
SBA Service Based Architecture
SDU Service Data Unit
SMF Session Management Function
SMSF SMS Function
SN Sequence Number
S-NSSAI Single Network Slice Selection Assistance information
SRB Signaling Radio Bearer carrying control plane data
SUPI Subscriber Permanent Identifier
TDF Traffic Detection Function
TA Tracking Area
TAI Tracking Area Identity
TCP Transmission Control Protocol
UDM Unified Data Management
UDP User Datagram Protocol
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
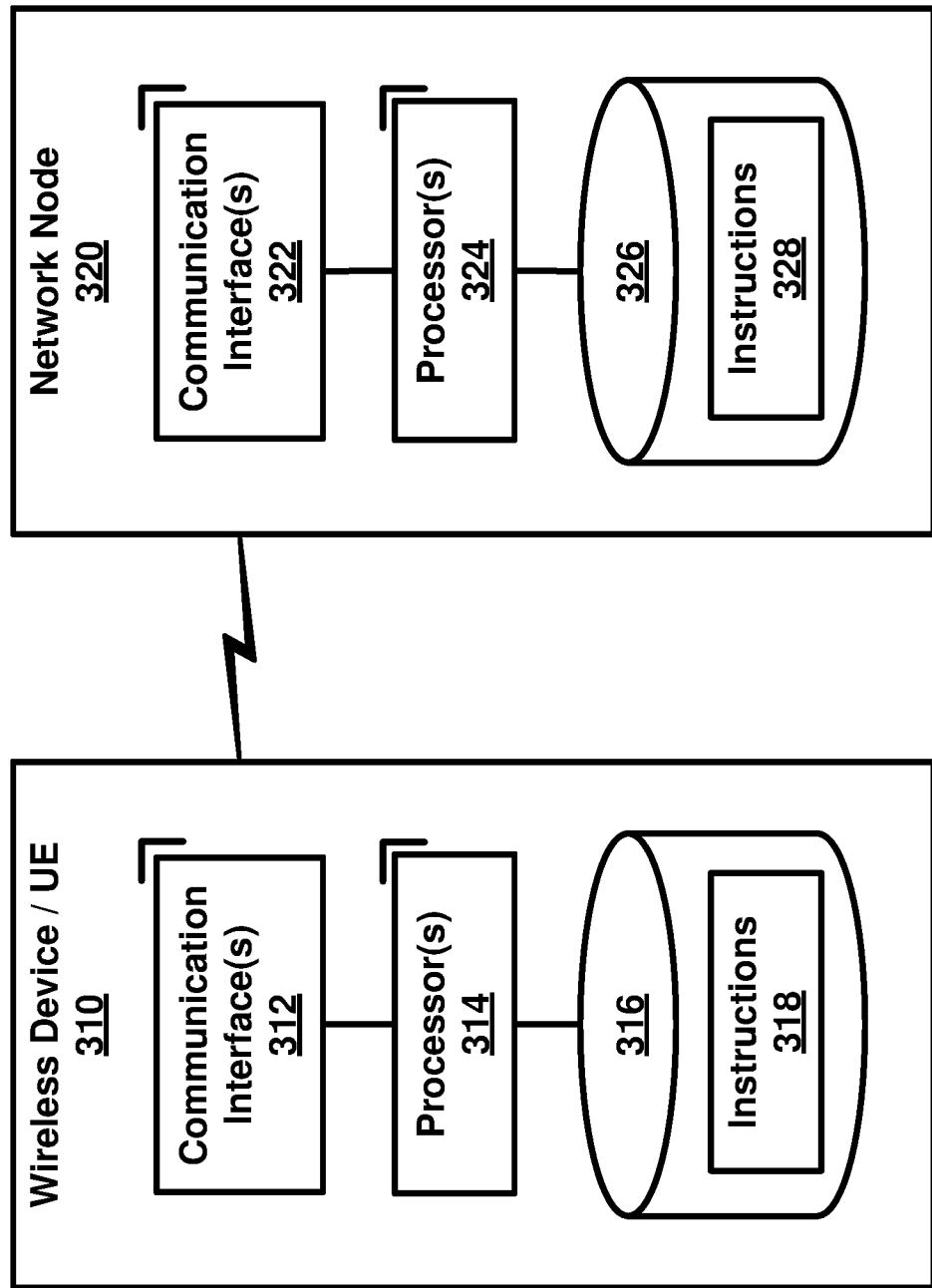
FIG. 3 is a system diagram of an example wireless device and a network node in a 5G system as per an aspect of an embodiment of the present disclosure.
Figure 4:
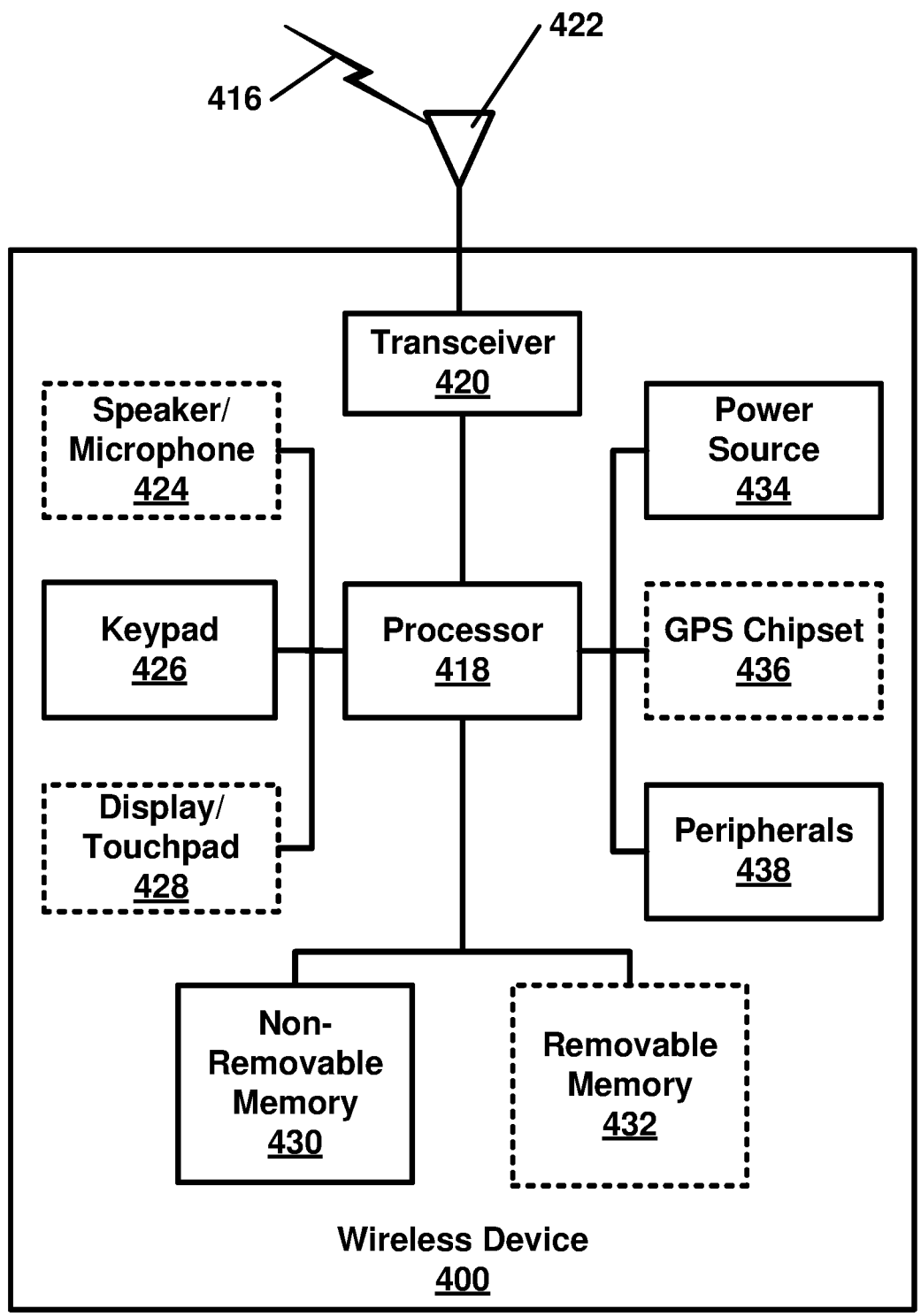
FIG. 4 is a system diagram of an example wireless device as per an aspect of an embodiment of the present disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may be employed once PDU session is established. IPv6 prefix allocation may be supported via IPv6 stateless autoconfiguration, if IPv6 is supported. IPv6 parameter configuration via stateless DHCPv6 may be supported.

The 5GC may support the allocation of a static IPv4 address and/or a static IPv6 prefix based on subscription information in the UDM 140 or based on the configuration on a per-subscriber, per-DNN basis.

User plane function(s) (UPF(s) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Un-trusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8:
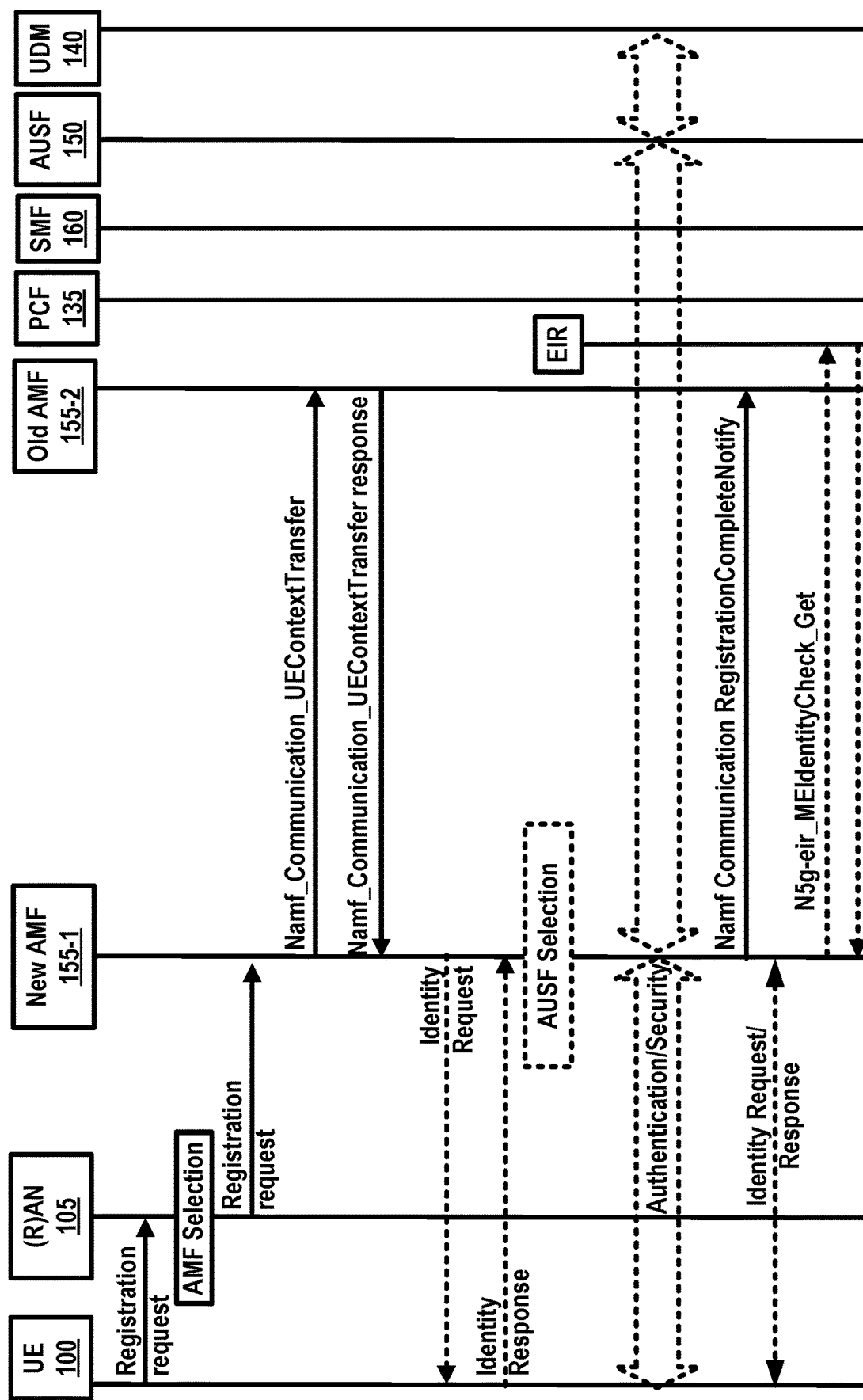
FIG. 8 and FIG. 9 is an example call flow for a UE registration procedure as per an aspect of an embodiment of the present disclosure.
Figure 9:
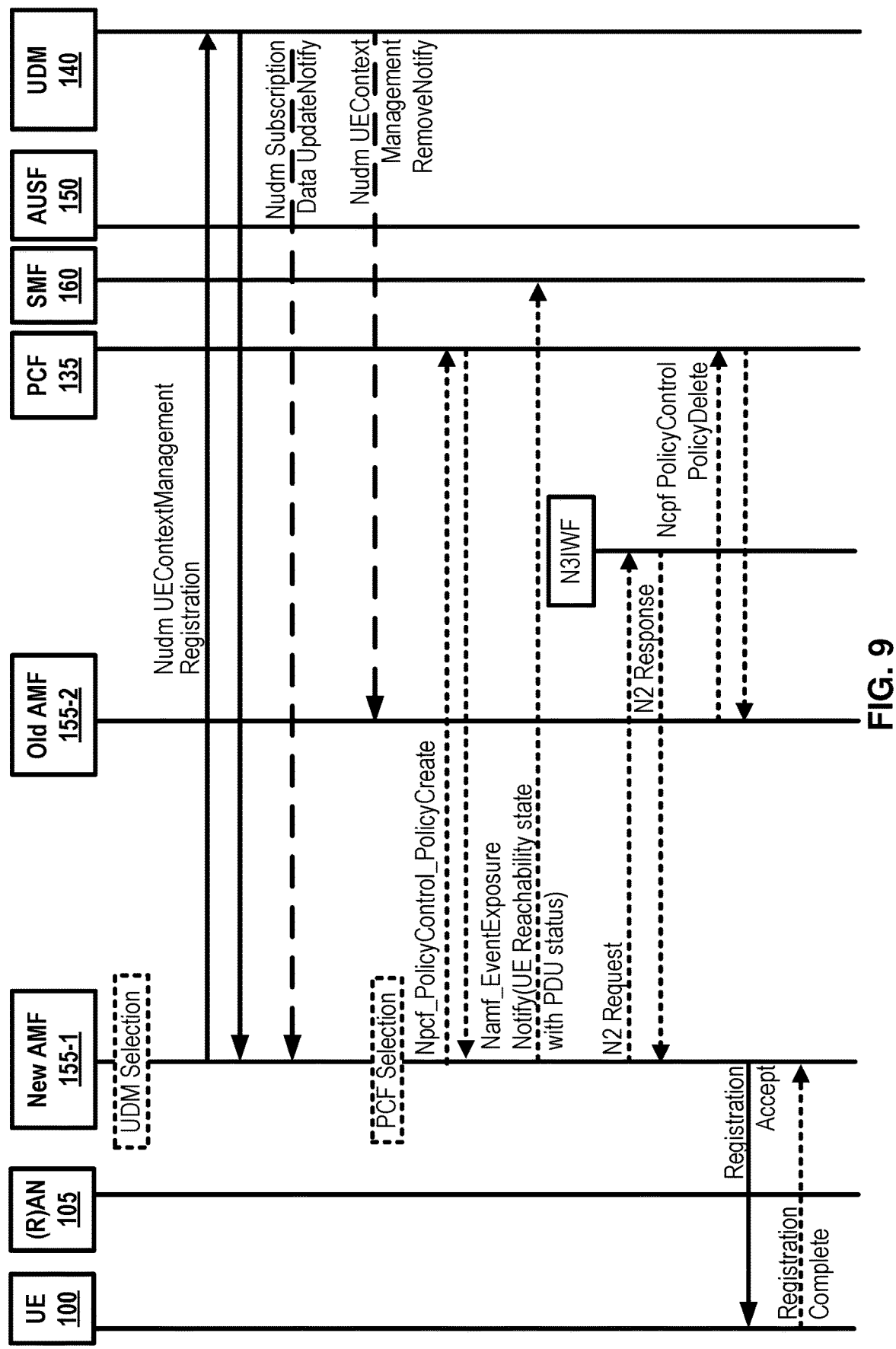

The initial registration procedure as depicted in example FIG. 8 and FIG. 9 may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

An example FIG. 5A and FIG. 5B depict the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

As shown in example FIGS. 6A and 6B, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIGS. 6A and 6B, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish a NAS signaling connection for a UE 100 in CM-IDLE 600 state. The procedure of releasing a NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
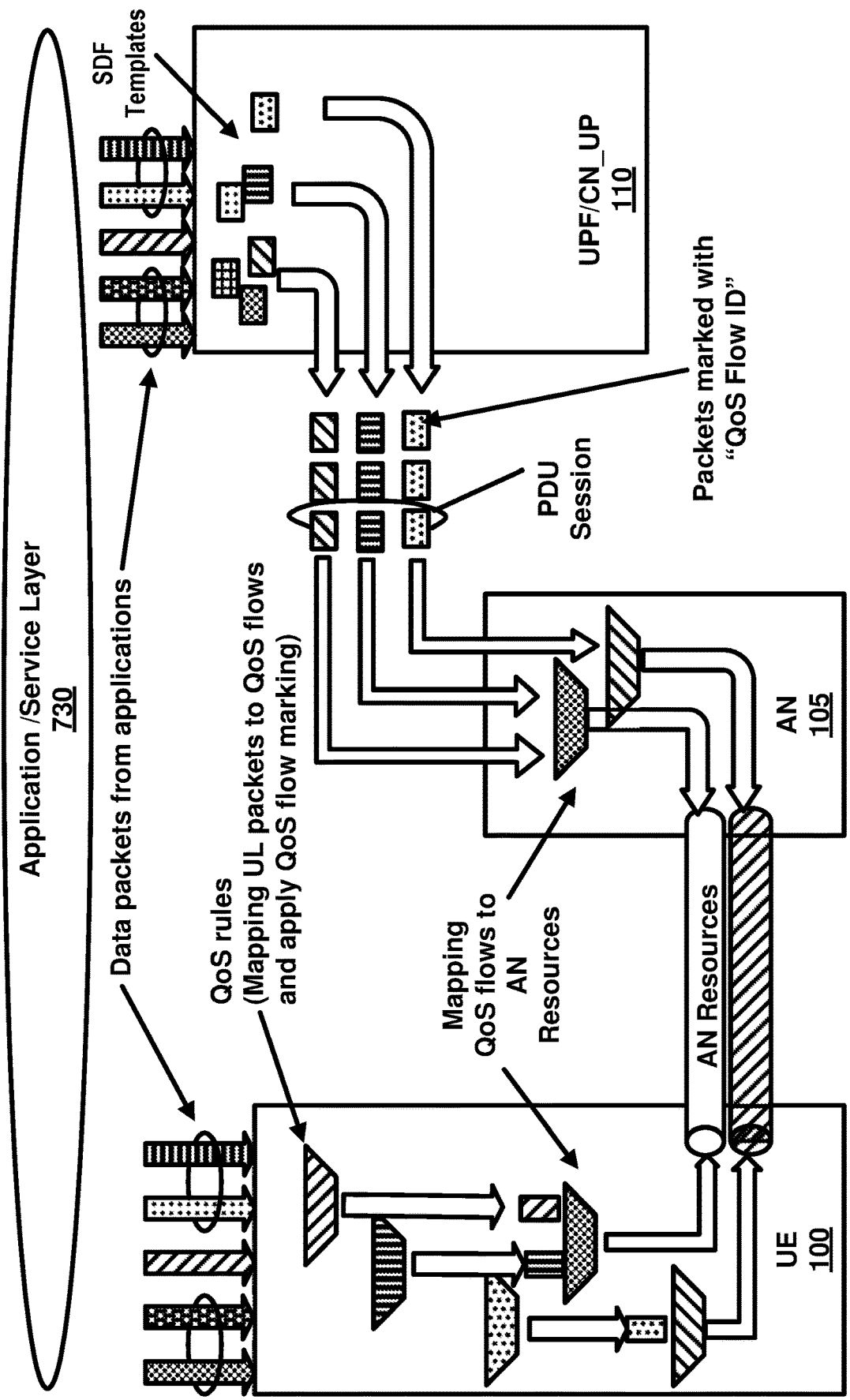
FIG. 7 is diagram for classification and marking traffic as per an aspect of an embodiment of the present disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may support reflective QoS. The QoS model may comprise flow mapping or packet marking at the UPF (CN_UP) 110, AN 105 and/or UE 100. Packets may arrive from and/or destined to the application/service layer 730 of UE 100, UPF (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two steps. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may include point-to-point reference points where necessary. (2) FIG. 2 is an example reference point representation, showing the interaction between the NF services in the network functions described by point-to-point reference point (e.g. N11) between any two network functions.

Figure 16:
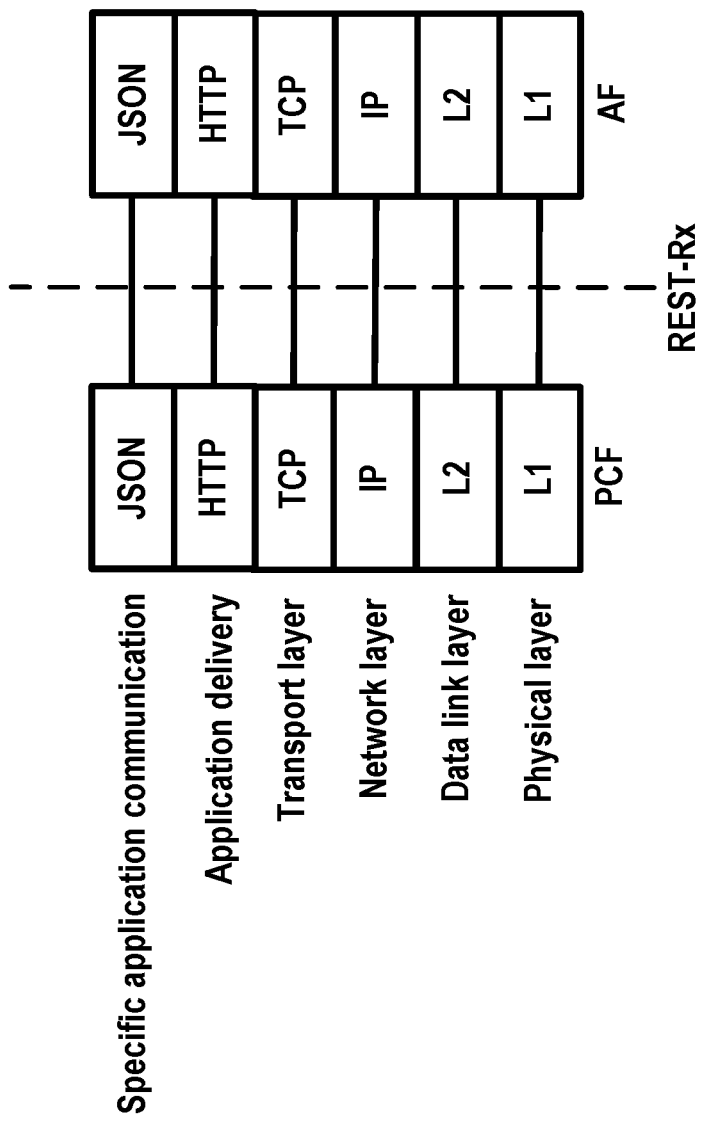
FIG. 16 is a figure showing an example protocol stack of the Rx reference point as per an aspect of an embodiment of the present disclosure.

As an example, the control plane of a communication system (e.g. 5G) may use service based architecture. The interface/reference point between an AF and a PCF (e.g. Rx interface or Rx reference point) may use HTTP protocol. Representational State Transfer (REST) may be used as an architectural style as appropriate. FIG. 16 is an example figure showing the protocol stack of the REST-Rx reference point. TCP may provide the communication service at the transport layer. An application delivery layer may provide the transport of the specific application communication data using HTTP. A specific application communication layer may comprise the transport of the JSON content type.

A HTTP request message may have a method/process to indicate to a server what action may be performed by the server. A client and/or a server may use one of the following HTTP methods/processes: POST: HTTP POST may be used to create a resource state. A request URI may define the address responsible for the creation of the resource. PUT: HTTP PUT may be used to replace a resource state. The full state of the resource may be provided in the body of the message. A request URI may define the resource which will be replaced. PATCH: HTTP PATCH method may apply to partial modifications to a resource. A request URI may define the resource which will be modified. GET: HTTP GET may be used to retrieve a resource state. A request URI may define the resource which is queried. DELETE: HTTP DELETE may be used to delete a resource state. A request URI may define the resource which will be deleted.

Implementation of the existing technologies may have issues in supporting specific services/applications. The existing service/application may have specific requirements for latency and reliability and may be public safety related. As shown in FIG. 14, the scenarios requiring low latency and high communication service availability may be discrete automation—motion control, discrete automation and process automation—remote control, etc. The FIG. 14 provides example performance requirements for these scenarios. The overall service latency may depend on the delay on a radio interface, transmission within the 5G system, transmission to an application server which may be outside the 5G system, and/or data processing. The existing technology may not be able to guarantee the QoS of the service in some cases. The application server may measure/detect end-to-end delay between the application server and a wireless device. This may have a problem that the application server may be required to support the measurement/detection function; and this may have a problem that the application server may know the end-to-end delay between the application server and wireless device. The application server may not have the capability to know which part of delay (e.g. from wireless device to access network, access network to core network, or core network to the application server) may be a reason causing an end-to-end delay between application server and a wireless device. Example embodiments provide enhanced mechanisms to monitor and report a service performance and/or QoS of a service between a wireless device and an access network, an access network and a core network, and/or a core network to an application server. In an example embodiment, a network entity in a 5G core network may notify an application server to adjust a service behavior.

Implementation of the existing technologies may have issues in supporting specific services/applications in roaming scenario. The existing service/application may have specific requirements for latency and reliability and may be public safety related. As shown in FIG. 14, the scenarios requiring low latency and high communication service availability may be discrete automation—motion control, discrete automation and process automation—remote control, etc. The FIG. 14 provides example performance requirements for these scenarios. The overall service latency may depend on the delay on a radio interface, transmission within the 5G system in visited PLMN and home PLMN, transmission to an application server which may be outside the 5G system, and/or data processing. The existing technology may not be able to guarantee the QoS of the service in some cases. The application server (e.g. HAF in roaming scenario) may measure/detect end-to-end delay between the application server and a wireless device. This may have a problem that the application server may be required to support the measurement/detection function; and this may have a problem that the application server may know the end-to-end delay between the application server and wireless device. The application server may not have the capability to know which part of delay (e.g. from wireless device to access network, access network to core network, or core network to the application server) may be a reason causing an end-to-end delay between application server and a wireless device, especially when the application server may be in the home PLMN and the wireless device may be in the visited PLMN. Example embodiments provide enhanced mechanisms to monitor and report a service performance and/or QoS of a service between a wireless device and an access network, an access network and a core network, and/or a core network to an application server, where the application server may be in the home PLMN and wireless device may be in the visited PLMN in roaming scenario (e.g. home routed roaming case). In an example embodiment, a network entity in a 5G core network in the visited PLMN may notify an application server in the home PLMN to adjust a service behavior.

Example 1

Figure 10:
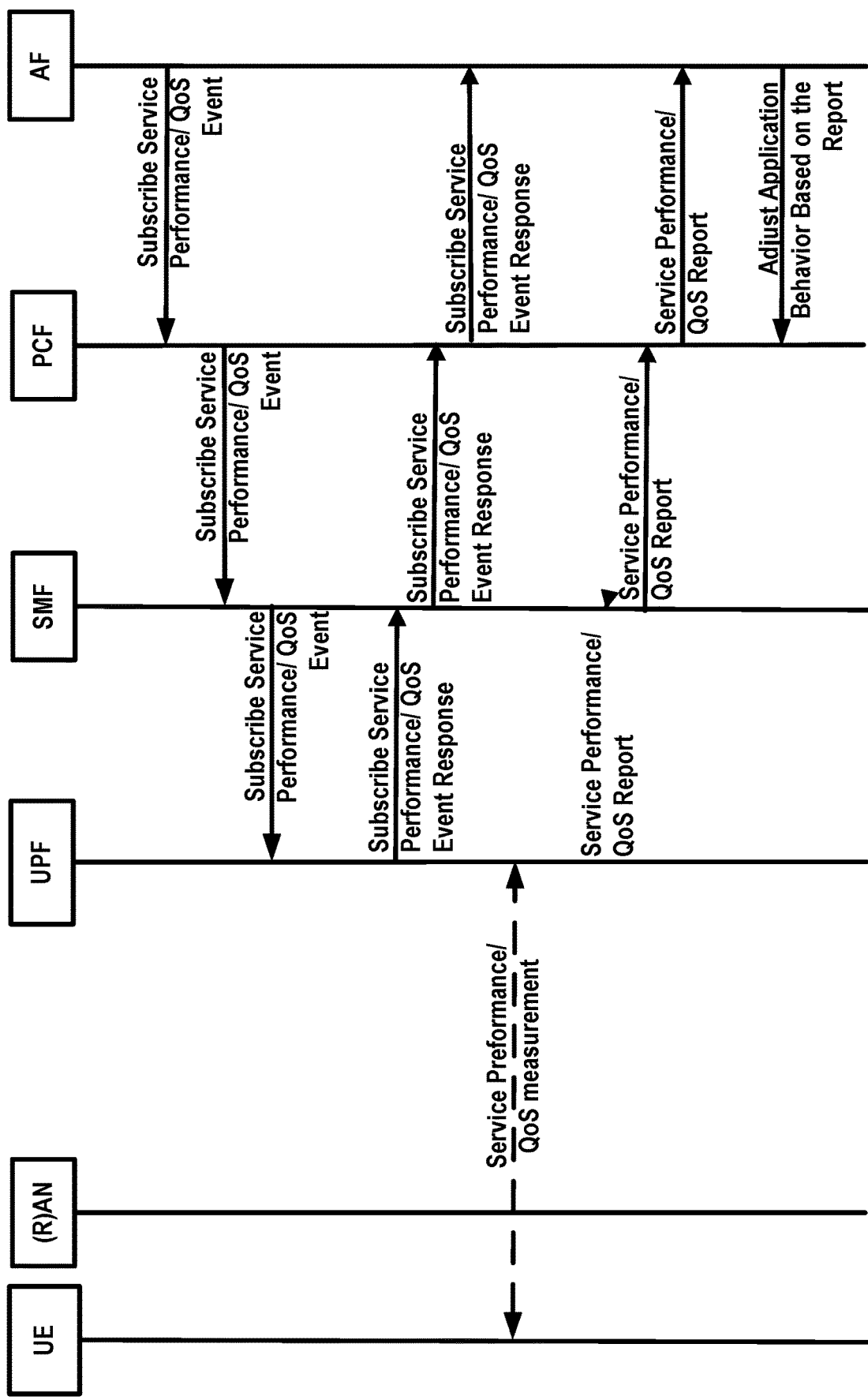
FIG. 10 is an example call flow diagrams as per an aspect of an embodiment of the present disclosure.

In an example, an AF may send a first message to a network node (e.g. PCF, or NEF). The first message may indicate a request to subscribe to at least one service performance/QoS event for a service data flow, a service/application, a PDU session, and/or a wireless device. The PCF may further subscribe the event to an SMF. FIG. 10 shows an example call flow which may comprise one or more actions.

An AF (application server) may send to a network function (e.g. PCF, or NEF) a message (e.g. subscribe service performance/QoS event, or application/service information provision) to subscribe to at least one service performance/QoS event for a service data flow, a service/application, a PDU session, and/or a wireless device. As an example, the AF may send to the PCF an HTTP POST message to subscribe to at least one service performance/QoS event. The message sent to the PCF from the AF may comprise one or more information elements. In an example, the message sent to the PCF comprises a first information element indicating service performance/QoS event trigger(s). The AF may request a network function (e.g. PCF) who receives the event trigger(s) to report the current value(s) of service performance/QoS if value(s) of service performance/QoS has(have) changed and/or the value(s) is(are) below threshold(s) (e.g. requested service performance/QoS). As an example, the current value of service performance/QoS may be the value(s) of service performance/QoS if value(s) of service performance/QoS has(have) changed and/or the value(s) is(are) below threshold(s) (e.g. requested service performance/QoS). In an example, the message sent to the PCF comprises a second information element indicating requested service performance/QoS value(s), and the second information element may be used to indicate requested service performance/QoS by the AF, which may comprise one or more parameters. In an example, the second information element comprises an end-to-end latency parameter. The end-to-end latency may be the time that takes to transfer a given piece of information from a source to a destination. As an example, the end-to-end latency between the wireless device and the application server/controller of discrete automation—motion control may be 1 ms. In an example, the second information element comprises a jitter parameter. The jitter may be a variation time in the delay of received packets. As an example, the jitter of discrete automation—motion control may be 1 μs. In an example, the second information element comprises a survival time parameter. The survival time may be the time that an application consuming a communication service may continue without an anticipated message. As an example, the survival time of discrete automation—motion control may be 0 ms. In an example, the second information element comprises a communication service availability parameter. The communication service availability may be dependable or reliable of service interfaces. As an example, the communication service availability of discrete automation—motion control may be 99,9999%. In an example, the second information element comprises a reliability parameter. The reliability may be dependable or reliable of a given network node. As an example, the reliability of discrete automation—motion control may be 99,9999%. In an example, the second information element comprises a user experienced data rate parameter. The user experienced data rate may be the minimum data rate required to achieve a sufficient quality experience. As an example, the user experienced data rate of discrete automation—motion control may be 1 Mbps up to 10 Mbps. In an example, the message sent to the PCF comprises a third information element indicating service data flow template. The service data flow template may be used to detect the service data flow (s) for the service performance/QoS event. In an example, the message sent to the PCF comprises a fourth information element indicating service/application identifier. The service/application identifier may be used to detect the service/application for the service performance/QoS event. In an example, the message sent to the PCF comprises a fifth information element indicating PDU session identifier. The PDU session identifier may be the identifier of a PDU session applied to the service performance/QoS event. In an example, the message sent to the PCF comprises a sixth information element indicating user identity of a wireless device. The user identity of a wireless device may be the identity of a wireless device applied to the service performance/QoS event. If the AF sends to the NEF above message (e.g. subscribe service performance/QoS event, or application/service information provision), as an example, the NEF forwards the message to the PCF.

In response to the message received from the AF or NEF, the PCF may take one or more actions. In an example action, the PCF makes the policy decision based on the information (e.g. requested service performance/QoS value (s)) received from the AF or NEF. In an example action, the PCF sends to an SMF a message (e.g. subscribe service performance/QoS event, or Nsmf_EventExposure_Subscribe) to subscribe event trigger(s) and/or provision the policy(s) (e.g. QoS policy(s)). The message may comprise the information received from the AF or NEF. As an example, the message sent to the SMF may comprise the information (e.g. requested service performance/QoS value (s)) received from the AF or NEF and/or policy(s) (e.g. QoS policy). As an example, the message sent to the SMF may comprise the policy(s) (e.g. QoS policy), where the policy(s) may comprise the information (e.g. requested service performance/QoS value (s)) received from the AF or NEF.

In response to the message received from the PCF, the SMF may send to a UPF a message (e.g. subscribe service performance/QoS event, or N4 session establishment/modification request) to subscribe event trigger(s) and/or provision the policy(s) (e.g. QoS policy(s)). The message may comprise one or more information elements received from the PCF. As an example, the message sent to the UPF may comprise the information (e.g. requested service performance/QoS value (s)) received from the PCF and/or policy(s) (e.g. QoS policy). As an example, the message sent to the UPF may comprise the policy(s) (e.g. QoS policy), where the policy(s) may comprise the information (e.g. requested service performance/QoS value (s)) received from the PCF. In response to the message received from the SMF, the UPF may send to the SMF a response message (e.g. subscribe service performance/QoS event response, or N4 session establishment/modification response).

In response to the message received from the UPF, the SMF may send to the PCF a response message (e.g. subscribe service performance/QoS event response, or Nsmf_EventExposure_Subscribe response). In response to the message received from the SMF, the PCF may send to the AF a response message (e.g. subscribe service performance/QoS event response, or application/service information provision response). As an example, the PCF may send to the AF a HTTP 201 CREATED message in response to the HTTP POST message.

Figure 15:
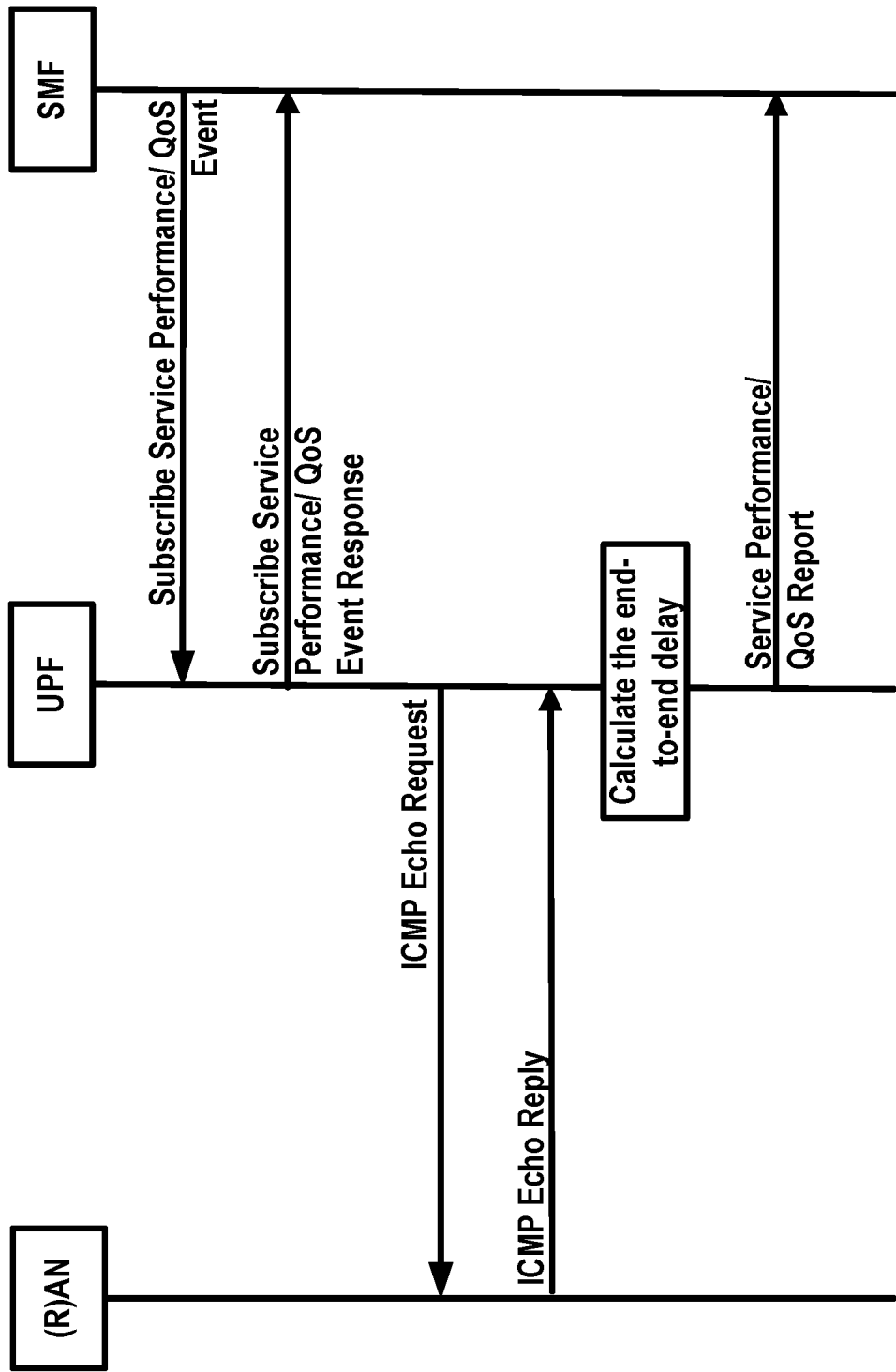
FIG. 15 is an example call flow diagrams as per an aspect of an embodiment of the present disclosure.

In response to the message received from the SMF, the UPF may take one or more actions. In an example action, the UPF monitors the service performance/QoS for the service data flow(s), the service/application, the PDU session, and/or the wireless device to measure/detect the at least one service performance/QoS event. The UPF may take one or more ways to measure/detect the service performance/QoS. In an example way, the UPF monitors service performance/QoS between the UPF and the wireless device based on an internet control message protocol (ICMP) echo function. As an example, the UPF may send to the wireless device ping packet(s) and calculate the service performance/QoS value (s) (e.g. end-to-end latency, jitter) after receiving the response from the wireless device. In an example way, the UPF monitors service performance/QoS between the UPF and (R)AN based on the ICMP echo function. As an example, the UPF may send to the (R)AN ping packet(s) and calculate the service performance/QoS value (s) (e.g. end-to-end latency, jitter) after receiving the response(s) from the (R)AN. FIG. 15 is an example call flow that UPF measures service performance/QoS by ICMP echo function. In an example way, the UPF queries service performance/QoS between the (R)AN and the wireless device. As an example, the UPF may send to the (R)AN a signaling message to query the service performance/QoS value(s) between the (R)AN and the wireless device, the (R)AN may measure/detect the performance/QoS value(s) between the (R)AN and the wireless device, and send to the UPF a response message comprising the service performance/QoS value(s). As an example, the UPF may send to the (R)AN a user plane data packet (e.g. in the header of the data packet) comprising an indication to query the service performance/QoS value(s) between the (R)AN and the wireless device, and/or the service performance/QoS value(s) between the wireless device and the application server. The (R)AN may measure/detect the performance/QoS value(s) between the (R)AN and the wireless device, and/or the (R)AN may request the wireless device to measure the service performance/QoS value(s) between the wireless device and the application server. The (R)AN may send to the UPF a user plane data packet (e.g. in the header of the data packet) comprising the measured service performance/QoS value(s). In an example way, the UPF monitors service performance/QoS between the UPF and the application server based on an internet control message protocol (ICMP) echo function. As an example, the UPF may send to the application server ping packet(s) and calculate the service performance/QoS value (s) (e.g. end-to-end latency, jitter) after receiving the response from the wireless device. In an example action, the UPF sends to the SMF a message (e.g. service performance/QoS measurement report) if the UPF detects at least one service performance/QoS event is triggered (e.g. value(s) of service performance/QoS has(have) changed and/or the value(s) is(are) below threshold(s) (e.g. requested service performance/QoS)) for at least one of: the service data flow; the service/application; the PDU session; and the wireless device. The message sent to the SMF from the UPF may comprise one or more information elements. In an example, the message comprises a first information element indicating service performance/QoS event trigger(s). In an example, the message sent to the SMF from the UPF comprises a second information element indicating measured service performance/QoS value (s), and the measured service performance/QoS value (s) may be used to indicate measured service performance/QoS by a network function (e.g. UPF), which may comprise one or more parameters. In an example, the second information element may comprise a parameter indicating service performance/QoS value type, and this parameter may be used to indicate the type or scope of the service performance/QoS. As an example, this parameter may comprise one or more types. An example type may be service performance/QoS value (e.g. end-to-end latency) between UPF and wireless device. An example type may be service performance/QoS value (e.g. end-to-end latency) between UPF and (R)AN. An example type may be service performance/QoS value (e.g. end-to-end latency) between (R)AN and wireless device. An example type may be service performance/QoS value (e.g. end-to-end latency) between UPF and application server. An example type may be service performance/QoS value (e.g. end-to-end latency) between UE and application server. In an example, the second information element may comprise a parameter indicating measured end-to-end latency. In an example, the second information element may comprise a parameter indicating measured jitter. In an example, the second information element may comprise a parameter indicating measured survival time. In an example, the second information element may comprise a parameter indicating measured communication service availability. In an example, the second information element may comprise a parameter indicating measured reliability. In an example, the second information element may comprise a parameter indicating measured user experienced data rate. In an example, the message sent to the SMF from the UPF comprises a third information element indicating service data flow template. In an example, the message sent to the SMF from the UPF comprises a fourth information element indicating service/application identifier. In an example, the message sent to the SMF from the UPF comprises a fifth information element indicating PDU session identifier. In an example, the message sent to the SMF from the UPF comprises an sixth information element indicating user identity of a wireless device.

In response to the message received from the UPF, the SMF may send to the PCF a message (e.g. service performance/QoS measurement report) comprising the information received from the UPF. In response to the message received from the SMF, the PCF may send to the AF or NEF a message (e.g. service performance/QoS measurement report) comprising the information received from the SMF. In case the NEF receives the message (e.g. service performance/QoS measurement report) from the PCF, the NEF may forward the message to the AF.

In response to the message received from the PCF or NEF, the AF may adjust the service behavior accordingly in a timely manner based on the information (e.g. service performance/QoS value (s) event trigger, and/or measured service performance/QoS value (s)) received from the PCF or NEF. As an example, the AF may change the codec rate of the video based on the measured service performance/QoS value (s) (e.g. the current service performance of the communication system may not be able to support the 8k Ultra High Definition (UHD) video, the codec rate of the video may be changed to 4K UHD). The AF may send to the PCF a message (e.g. application/service information provision) for the changing of application information. As an example, the AF may analysis which part of delay (e.g. from wireless device to access network, access network to core network, or core network to the application server) may be the reason causing a long end-to-end delay between application server and the wireless device. For example, the AF may determine that the end-to-end delay may be caused by the delay between the core network and the application server, the AF may send to the PCF a message (e.g. HTTP PUT) indicating the changing of the route policy between the core network (e.g. UPF) and the application server. The PCF may send to the SMF a policy to select a better route which has short delay between UPF and the application server compare to the current end-to-end delay, the SMF may send to the policy to the UPF for enforcement.

Example 2

Figure 11:
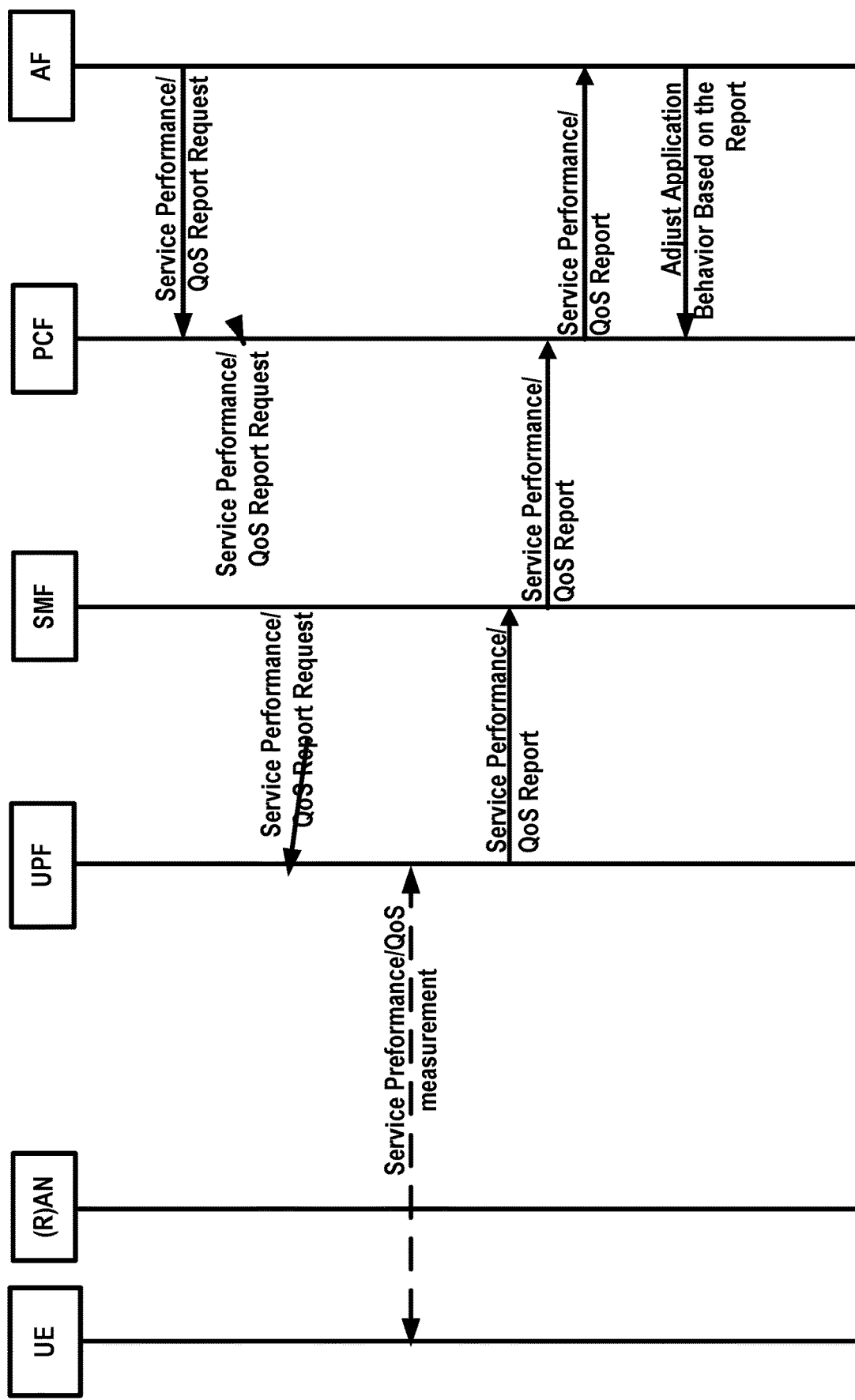
FIG. 11 is an example call flow diagrams as per an aspect of an embodiment of the present disclosure.

In an example, an AF may send a first message to a network node (e.g. PCF, or NEF). The first message may indicate a request for at least one service performance/QoS report for a service data flow, a service/application, a PDU session, and/or a wireless device. The PCF may further request the report from an SMF. FIG. 11 shows an example call flow which may comprise one or more of the following actions:

An AF may send to a network function (e.g. PCF, or NEF) a message (e.g. service performance/QoS report request, or application/service information provision) to indicate the PCF or NEF reporting at least one current service performance/QoS for a service data flow, a service/application, a PDU session, and/or a wireless device. The message sent to the network function (e.g. PCF, or NEF) may comprise one or more information elements. In an example, the message comprises an information element of service performance/QoS report indication(s). The indication may be used to by the AF to query current value(s) of one or more of the following parameters for service performance/QoS: an end-to-end latency; a jitter; a survival time; a communication service availability; a reliability; and a user experienced data rate. As an example, a network function (e.g. UPF) may measure the current value(s) of service performance/QoS parameters when receiving the service performance/QoS report indication(s). In an example, the message comprises an information element indicating service data flow template. In an example, the message comprises an information element indicating service/application identifier. In an example, the message comprises an information element indicating PDU session identifier. In an example, the message comprises an information element indicating user identity of a wireless device. If the AF sends to the NEF above message (e.g. service performance/QoS report request, or application/service information provision), as an example, the NEF may forward the message to the PCF.

In response to the message received from the AF or NEF, the PCF may take one or more actions. In an example action, the PCF makes the policy decision based on the information received from the AF or NEF. In an example action, the PCF sends to an SMF a message (e.g. service performance/QoS report request) to request at least one current service performance/QoS report. The message may comprise the information received from the AF or NEF. As an example, the message sent to the SMF may comprise the information (e.g. service performance/QoS report indication(s)) received from the AF or NEF and/or policy(s) (e.g. QoS policy). As an example, the message sent to the SMF may comprise the policy(s) (e.g. QoS policy), where the policy(s) may comprise the information (e.g. service performance/QoS report indication(s)) received from the AF or NEF. In response to the message received from the PCF, the SMF may send to a UPF a message (e.g. service performance/QoS report request, or N4 session establishment/modification request) to request the current service performance/QoS report and/or provision the policy(s) (e.g. QoS policy(s)). The message may comprise the information received from the PCF. As an example, the message sent to the UPF may comprise the information (e.g. service performance/QoS report indication(s)) received from the PCF and/or policy(s) (e.g. QoS policy). As an example, the message sent to the UPF may comprise the policy(s) (e.g. QoS policy), where the policy(s) may comprise the information (e.g. service performance/QoS report indication(s)) received from the PCF.

In response to the message received from the SMF, the UPF may take one or more actions. In an example action, the UPF monitors the service performance/QoS of the service data flow(s), the service/application, the PDU session, and/or the wireless device to measure/detect the at least one service performance/QoS event. The UPF may take one or more ways to measure/detect the service performance/QoS. In an example way, the UPF monitors service performance/QoS between the UPF and the wireless device based on an internet control message protocol (ICMP) echo function. As an example, the UPF may send to the wireless device ping packet(s) and calculate the service performance/QoS value (s) (e.g. end-to-end latency, jitter) after receiving the response from the wireless device. In an example way, the UPF monitors service performance/QoS between the UPF and a (R)AN based on the ICMP echo function. As an example, the UPF may send to the (R)AN ping packet(s), and calculate the service performance/QoS value (s) (e.g. end-to-end latency, jitter) after receiving the response(s) from the (R)AN. In an example way, the UPF queries service performance/QoS between the (R)AN and the wireless device. As an example, the UPF may send to the (R)AN a signaling message to query the service performance/QoS value(s) between the (R)AN and the wireless device, the (R)AN may measure/detect the performance/QoS value(s) between the (R)AN and the wireless device, and send to the UPF a response message comprising the service performance/QoS value(s). As an example, the UPF may send to the (R)AN a user plane data packet (e.g. in the header of the data packet) comprising an indication to query the service performance/QoS value(s) between the (R)AN and the wireless device, the (R)AN may measure/detect the performance/QoS value(s) between the (R)AN and the wireless device, and send to the UPF a user plane data packet (e.g. in the header of the data packet) comprising the service performance/QoS value(s). In an example action, the UPF may send to the SMF a report message (e.g. service performance/QoS measurement report, or N4 session establishment/modification response), and the report message may comprise one or more information elements. In an example, the report message comprises a first information element indicating measured service performance/QoS value (s). The first information element may be used to indicate measured service performance/QoS, which may comprise one or more parameters. In an example, the first information element comprises a parameter indicating service performance/QoS value type, and this parameter may be used to indicate the type or scope of the service performance/QoS. As an example, this parameter may comprise one or more of the following types: service performance/QoS value (e.g. end-to-end latency) between UPF and wireless device; service performance/QoS value (e.g. end-to-end latency) between UPF and (R)AN; service performance/QoS value (e.g. end-to-end latency) between (R)AN and wireless device; service performance/QoS value (e.g. end-to-end latency) between UPF and application server; and service performance/QoS value (e.g. end-to-end latency) between UE and application server. In an example, the first information element comprises a parameter indicating measured end-to-end latency. In an example, the first information element comprises a parameter indicating measured jitter. In an example, the first information element comprises a parameter indicating measured survival time. In an example, the first information element comprises a parameter indicating measured communication service availability. In an example, the first information element comprises a parameter indicating measured reliability. In an example, the first information element comprises a parameter indicating measured user experienced data rate. In an example, the report message comprises a second information element indicating service data flow template. In an example, the report message comprises a third information element indicating service/application identifier. In an example, the report message comprises a fourth information element indicating PDU session identifier. In an example, the report message comprises a fifth information element indicating user identity of a wireless device.

In response to the message received from the UPF, the SMF may send to the PCF a message (e.g. service performance/QoS measurement report) comprising the information received from the UPF. In response to the message received from the SMF, the PCF may send to the AF or NEF a message (e.g. service performance/QoS measurement report) comprising the information received from the SMF. In case the NEF receives the message (e.g. service performance/QoS measurement report) from the PCF, the NEF may forward the message to the AF. In response to the message received from the PCF or NEF, the AF may adjust the service behavior accordingly in a timely manner based on the information (e.g. measured service performance/QoS value (s)) received from the PCF or NEF. As an example, the AF may change the codec rate of the video based on the measured service performance/QoS value (s) (e.g. the current service performance of the communication system may not be able to support the 8k Ultra High Definition (UHD) video, the codec rate of the video may be changed to 4K UHD). The AF may send to the PCF a message (e.g. application/service information provision) for the changing of application information.

Example 3

Figure 12:
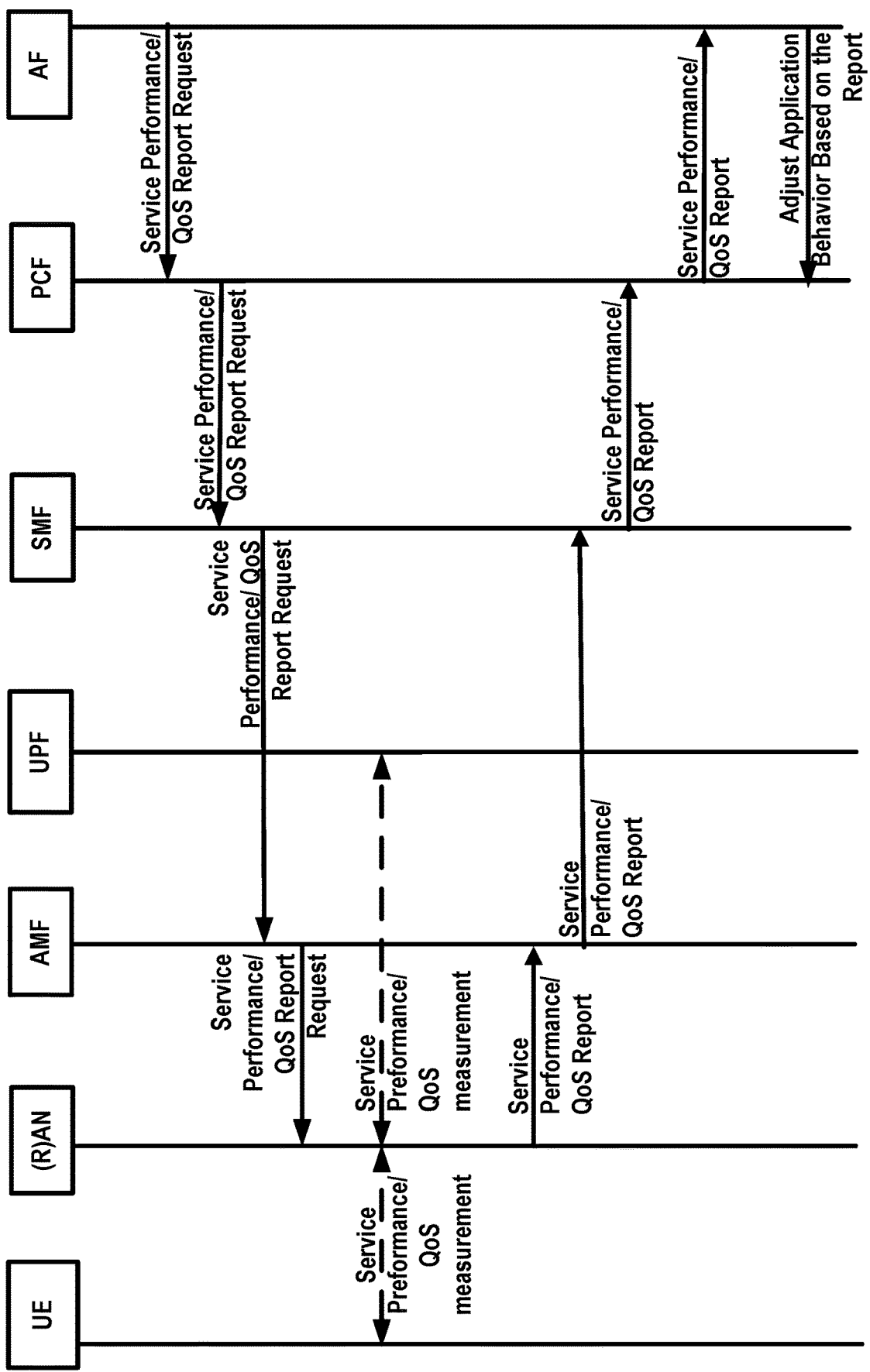
FIG. 12 is an example call flow diagrams as per an aspect of an embodiment of the present disclosure.

In an example, a (R)AN may perform service performance/QoS measurement rather than a UPF performing the measurement compare to Example 2. FIG. 12 shows an example call flow which may comprise one or more actions.

An AF may send to a network function (e.g. PCF, or NEF) a message (e.g. service performance/QoS report request, or application/service information provision) to indicate the PCF or NEF reporting at least one current service performance/QoS for a service data flow, a service/application, a PDU session, and/or a wireless device. The message may comprise one or more information elements. In an example, the message comprises an information element of service performance/QoS report indication(s). The AF may use the indication(s) to query current value(s) of one or more of the following parameters for service performance/QoS: end-to-end latency; jitter; survival time; communication service availability; reliability; and user experienced data rate. In an example, the message comprises an information element indicating service data flow template. In an example, the message comprises an information element indicating service/application identifier. In an example, the message comprises an information element indicating PDU session identifier. In an example, the message comprises an information element indicating user identity of a wireless device. If the AF sends to the NEF above message (e.g. service performance/QoS report request, or application/service information provision), as an example, the NEF may forward the message to the PCF.

In response to the message received from the AF or NEF, the PCF may take one or more actions. In an example action, the PCF makes the policy decision based on the information received from the AF or NEF. In an example action, the PCF sends to an SMF a message (e.g. service performance/QoS report request) to indicate at least one current service performance/QoS report. The message may comprise the information received from the AF or NEF. As an example, the message sent to the SMF may comprise the information (e.g. service performance/QoS report indication(s)) received from the AF or NEF and/or policy(s) (e.g. QoS policy). As an example, the message sent to the SMF may comprise the policy(s) (e.g. QoS policy), where the policy(s) may comprise the information (e.g. service performance/QoS report indication(s)) received from the AF or NEF.

In response to the message received from the PCF, the SMF may send to an AMF a message (e.g. service performance/QoS report request) to request the current service performance/QoS report and/or provision the policy(s) (e.g. QoS policy(s)). The message may comprise the information received from the PCF. As an example, the message sent to the AMF may comprise the information (e.g. service performance/QoS report indication(s)) received from the PCF and/or policy(s) (e.g. QoS policy). As an example, the message sent to the AMF may comprise the policy(s) (e.g. QoS policy), where the policy(s) may comprise the information (e.g. service performance/QoS report indication(s)) received from the PCF. In response to the message received from the SMF, the AMF may send to a (R)AN a message (e.g. service performance/QoS report request) to request the current service performance/QoS report and/or provision the policy(s) (e.g. QoS policy(s)). The message may comprise the information received from the SMF. As an example, the message sent to the (R)AN may comprise the information (e.g. service performance/QoS report indication(s)) received from the SMF and/or policy(s) (e.g. QoS policy). As an example, the message sent to the (R)AN may comprise the policy(s) (e.g. QoS policy), where the policy(s) may comprise the information (e.g. service performance/QoS report indication(s)) received from the SMF.

In response to the message received from the AMF, the (R)AN may take one or more of actions. In an example action, the (R)AN monitors the service performance/QoS of the service data flow(s), the service/application, the PDU session, and/or the wireless device to measure/detect the at least one service performance/QoS event. The (R)AN may take one or more ways to measure/detect the service performance/QoS. In an example way, the (R)AN monitors service performance/QoS between the (R)AN and UPF based on the ICMP echo function; and As an example, the (R)AN may send to the UPF ping packet(s) and calculate the service performance/QoS value (s) (e.g. end-to-end latency, jitter) after receiving the response(s) from the UPF. In an example way, the (R)AN queries service performance/QoS between the (R)AN and the wireless device. As an example, the (R)AN may send to the wireless device a data packet (e.g. PDCP packet) and calculate the service performance/ QoS value (s) (e.g. end-to-end latency, jitter) after receiving the response(s) from the wireless device. In an example action, the (R)AN may send to the AMF a message (e.g. service performance/QoS measurement report), and the report message may comprise one or more information elements. In an example the report message comprises a first information element indicating measured service performance/QoS value (s), and the first information element may be used to indicate measured service performance/QoS, which may comprise one or more parameters. In an example, the first information element comprises a parameter indicating service performance/QoS value type, and this parameter may be used to indicate the type or scope of the service performance/QoS. As an example, this parameter may comprise one or more of the following types: service performance/QoS value (e.g. end-to-end latency) between UPF and wireless device; service performance/QoS value (e.g. end-to-end latency) between UPF and (R)AN; service performance/QoS value (e.g. end-to-end latency) between (R)AN and wireless device; service performance/QoS value (e.g. end-to-end latency) between UPF and application server; and service performance/QoS value (e.g. end-to-end latency) between UE and application server. In an example, the first information element comprises a parameter indicating measured end-to-end latency. In an example, the first information element comprises a parameter indicating measured jitter. In an example, the first information element comprises a parameter indicating measured survival time. In an example, the first information element comprises a parameter indicating measured communication service availability. In an example, the first information element comprises a parameter indicating measured reliability. In an example, the first information element comprises a parameter indicating measured user experienced data rate. In an example the report message comprises a second information element indicating service data flow template. In an example the report message comprises a third information element indicating service/application identifier. In an example the report message comprises a fourth information element indicating PDU session identifier. In an example the report message comprises a fifth information element indicating user identity of a wireless device.

In response to the message received from the (R)AN, the AMF may send to the SMF a message (e.g. service performance/QoS measurement report) comprising the information received from the (R)AN. In response to the message received from the AMF, the SMF may send to the PCF a message (e.g. service performance/QoS measurement report) comprising the information received from the AMF. In response to the message received from the SMF, the PCF may send to the AF or NEF a message (e.g. service performance/QoS measurement report) comprising the information received from the SMF. In case the NEF receives the message (e.g. service performance/QoS measurement report) from the PCF, the NEF may forward the message to the AF. In response to the message received from the PCF or NEF, the AF may adjust the service behavior accordingly in a timely manner based on the information (e.g. measured service performance/QoS value (s)) received from the PCF or NEF. As an example, the AF may change the codec rate of the video based on the measured service performance/ QoS value (s) (e.g. the current service performance of the communication system may not be able to support the 8k Ultra High Definition (UHD) video, the codec rate of the video may be changed to 4K UHD). The AF may send to the PCF a message (e.g. application/service information provision) for the changing of application information.

Example 4

Figure 13:
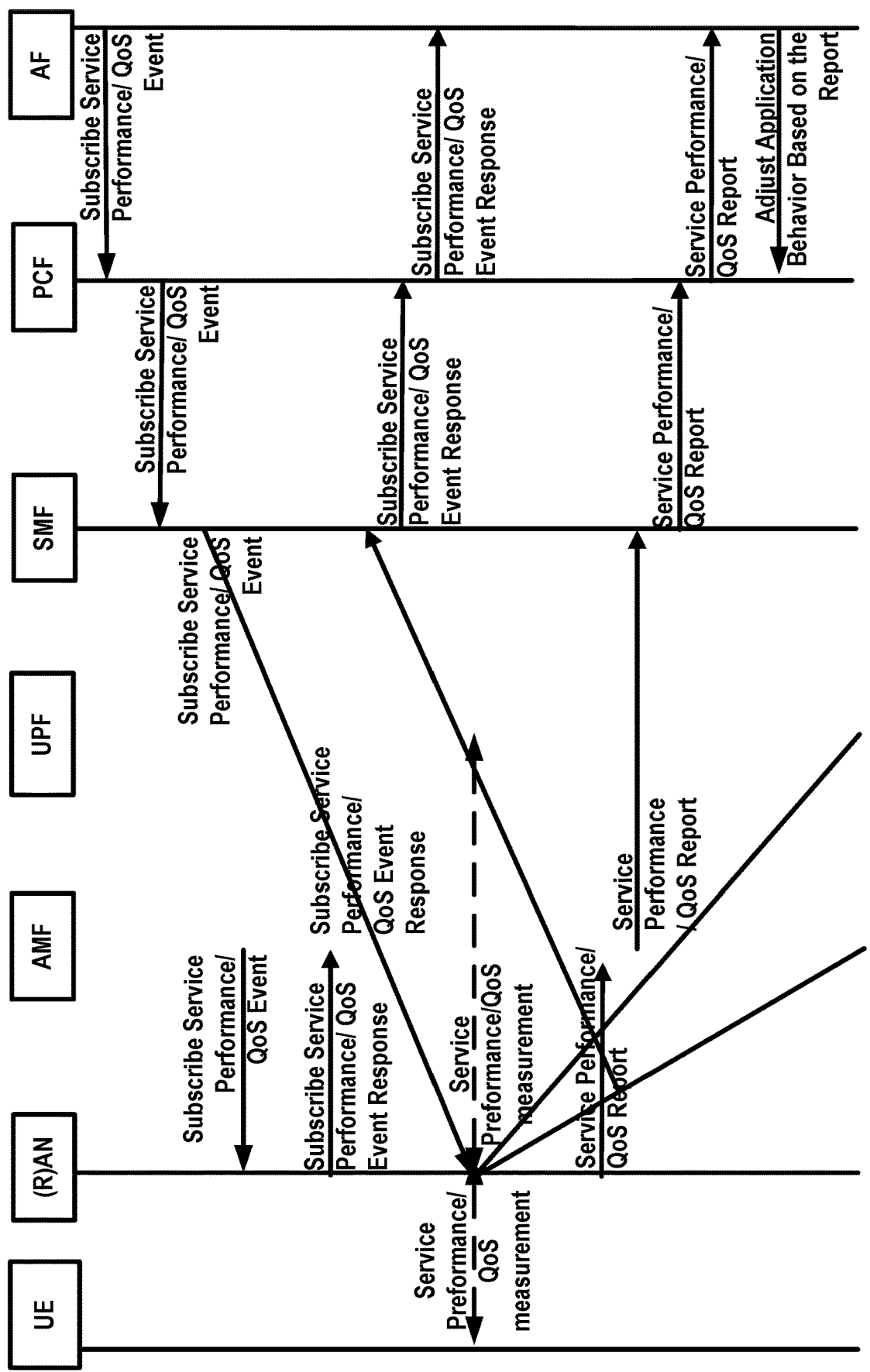
FIG. 13 is an example call flow diagrams as per an aspect of an embodiment of the present disclosure.

In an example, a (R)AN may receive service performance/ QoS event subscription from an AMF, the (R)AN may report to the AMF when the event is triggered. FIG. 13 shows an example call flow which may comprise one or more actions.

An AF may send to a network function (e.g. PCF, or NEF) a message (e.g. subscribe service performance/QoS event, or application/service information provision) to subscribe to at least one service performance/QoS event for a service data flow, a service/application, a PDU session, and/or a wireless device. The message may comprise one or more information elements. In an example, the message comprises an information element indicating service performance/QoS event trigger(s). The event trigger may be used to indicate the current value(s) of service performance/QoS may be requested reported if value(s) of service performance/QoS has(have) changed and/or the value(s) is(are) below threshold(s) (e.g. requested service performance/QoS). In an example, the message comprises an information element indicating requested service performance/QoS value (s), and this information element (IE) may be used to indicate requested service performance/QoS by the AF, which may comprise one or more of the following parameters: end-to-end latency; jitter; survival time; communication service availability; reliability; user experienced data rate. In an example, the message comprises an information element indicating service data flow template. In an example, the message comprises an information element indicating service/application identifier. In an example, the message comprises an information element indicating PDU session identifier. In an example, the message comprises an information element indicating user identity of a wireless device. If the AF sends to the NEF above message (e.g. subscribe service performance/QoS event, or application/service information provision), as an example, the NEF may forward the message to the PCF.

In response to the message received from the AF or NEF, the PCF may take one or more actions. In an example action, the PCF makes the policy decision based on the information (e.g. requested service performance/QoS value (s)) received from the AF or NEF. In an example action, the PCF sends to an SMF a message (e.g. subscribe service performance/QoS event, or Nsmf_EventExposure_Subscribe) to subscribe event trigger(s) and/or provision the policy(s) (e.g. QoS policy(s)). The message may comprise the information received from the AF or NEF. As an example, the message sent to the SMF may comprise the information (e.g. requested service performance/QoS value (s)) received from the AF or NEF and/or policy(s) (e.g. QoS policy). As an example, the message sent to the SMF may comprise the policy(s) (e.g. QoS policy), where the policy(s) may comprise the information (e.g. requested service performance/QoS value (s)) received from the AF or NEF.

In response to the message received from the PCF, the SMF may send to an AMF a message (e.g. subscribe service performance/QoS event) to subscribe event trigger(s) and/or provision the policy(s) (e.g. QoS policy(s)). The message may comprise the information received from the PCF. As an example, the message sent to the AMF may comprise the information (e.g. requested service performance/QoS value (s)) received from the PCF and/or policy(s) (e.g. QoS policy). As an example, the message sent to the AMF may comprise the policy(s) (e.g. QoS policy), where the policy(s) may comprise the information (e.g. requested service performance/QoS value (s)) received from the PCF. In response to the message received from the SMF, the AMF may send to a (R)AN a message (e.g. subscribe service performance/QoS event) to subscribe event trigger(s) and/or provision the policy(s) (e.g. QoS policy(s)). The message may comprise the information received from the SMF. As an example, the message sent to the (R)AN may comprise the information (e.g. requested service performance/QoS value (s)) received from the SMF and/or policy(s) (e.g. QoS policy). As an example, the message sent to the (R)AN may comprise the policy(s) (e.g. QoS policy), where the policy(s) may comprise the information (e.g. requested service performance/QoS value (s)) received from the SMF. In response to the message received from the AMF, the (R)AN may send to the AMF a response message (e.g. subscribe service performance/QoS event response). In response to the message received from the (R)AN, the AMF may send to the SMF a response message (e.g. subscribe service performance/QoS event response). In response to the message received from the AMF, the SMF may send to the PCF a response message (e.g. subscribe service performance/QoS event response, or Nsmf_EventExposure_Subscribe response). In response to the message received from the SMF, the PCF may send to the AF a response message (e.g. subscribe service performance/QoS event response, or application/service information provision response).

In response to the message received from the AMF, the (R)AN may take one or more actions. In an example action, the (R)AN monitors the service performance/QoS of the service data flow(s), the service/application, the PDU session, and/or the wireless device to measure/detect the at least one service performance/QoS event. The (R)AN may take one or more ways to measure/detect the service performance/QoS. In an example way, the (R)AN monitors service performance/QoS between the (R)AN and UPF based on the ICMP echo function. As an example, the (R)AN may send to UPF the ping packet(s) and calculate the service performance/QoS value (s) (e.g. end-to-end latency, jitter) after receiving the response(s) from the UPF. In an example way, the (R)AN queries service performance/QoS between the (R)AN and the wireless device. As an example, the UPF may send to the (R)AN a signaling message to query the service performance/QoS value(s) between the (R)AN and the wireless device, the (R)AN may measure/detect the performance/QoS value(s) between the (R)AN and the wireless device, and send to the UPF a response message comprising the service performance/QoS value(s). As an example, the (R)AN may send to the wireless device a data packet (e.g. PDCP packet) and calculate the service performance/QoS value (s) (e.g. end-to-end latency, jitter) after receiving the response(s) from the wireless device. In an example action, the (R)AN may send to the AMF a message (e.g. service performance/QoS measurement report) if the (R)AN detects at least one service performance/QoS event is triggered (e.g. value(s) of service performance/QoS has(have) changed and/or the value(s) is(are) below threshold(s) (e.g. requested service performance/QoS)) for at least one of: the service data flow; the service/application; the PDU session; and the wireless device. The measurement report message may comprise one or more information elements. In an example, the measurement report message comprises an information element indicating service performance/QoS event trigger(s). In an example, the measurement report message comprises a first information element indicating measured service performance/QoS value (s), and the first information element (IE) may be used to indicate measured service performance/QoS, which may comprise one or more parameters. In an example, the first information element comprises a parameter indicating service performance/QoS value type, and this parameter may be used to indicate the type or scope of the service performance/QoS. As an example, this parameter may comprise one or more of the following types: service performance/QoS value (e.g. end-to-end latency)

between UPF and (R)AN; service performance/QoS value (e.g. end-to-end latency) between (R)AN and wireless device; service performance/QoS value (e.g. end-to-end latency) between UE and application server. In an example, the first information element comprises a parameter indicating measured end-to-end latency. In an example, the first information element comprises a parameter indicating measured jitter. In an example, the first information element comprises a parameter indicating measured survival time. In an example, the first information element comprises a parameter indicating measured communication service availability. In an example, the first information element comprises a parameter indicating measured reliability. In an example, the first information element comprises a parameter indicating measured user experienced data rate. In an example, the measurement report message comprises a second information element indicating service data flow template. In an example, the measurement report message comprises a third information element indicating service/application identifier. In an example, the measurement report message comprises a fourth information element indicating PDU session identifier. In an example, the measurement report message comprises a fifth information element indicating user identity of a wireless device.

In response to the message received from the (R)AN, the AMF may send to the SMF a message (e.g. service performance/QoS measurement report) comprising the information received from the (R)AN. In response to the message received from the AMF, the SMF may send to the PCF a message (e.g. service performance/QoS measurement report) comprising the information received from the AMF. In response to the message received from the SMF, the PCF may send to the AF or NEF a message (e.g. service performance/QoS measurement report) comprising the information received from the SMF. In case the NEF receives the message (e.g. service performance/QoS measurement report) from the PCF, the NEF may forward the message to the AF.

In response to the message received from the PCF or NEF, the AF may adjust the service behavior accordingly in a timely manner based on the information (e.g. service performance/QoS value (s) event trigger, and/or measured service performance/QoS value (s)) received from the PCF or NEF. As an example, the AF may change the codec rate of the video based on the measured service performance/QoS value (s) (e.g. the current service performance of the communication system may not be able to support the 8k Ultra High Definition (UHD) video, the codec rate of the video may be changed to 4K UHD). The AF may send to the PCF a message (e.g. application/service information provision) for the changing of application information.

As an example, an SMF may receive from a PCF a first message indicating a request to subscribe to at least one service performance/QoS event for a service data flow, a service/application, a PDU session, and/or a wireless device, wherein the first message may comprise at least one of: at least one first information element (IE) indicating the at least one service performance/QoS event; at least one second IE indicating service performance/QoS values comprising at least one of: a first end-to-end latency; a first jitter; a first survival time; a first communication service availability; a first reliability value; or a first user experienced data rate; at least one third IE indicating a template of a service data flow; at least one fourth IE indicating a first identifier of service/application; at least one fifth IE indicating a second identifier of a PDU session; or at least one six IE indicating a user identity of a wireless device; sending, by the SMF to a UPF and in response to the first message, a second message indicating the request to subscribe to the at least one service performance/QoS event;

As an example, the may receive from the UPF a response message to the second message, wherein the response message may indicate that the at least one service performance/QoS event is triggered for one of: the service data flow; the service/application; the PDU session; and the wireless device; wherein the response message may comprise at least one service performance/QoS value comprising at least one of the following: a second end-to-end latency; a second jitter; a second survival time; a second communication service availability; a second reliability; or a second user experienced data rate.

As an example, the SMF may send to the PCF, a third message comprising the at least one service performance/QoS value.

In an example, the UPF may monitor service performance/QoS of the service data flow, the service/application, the PDU session, and/or the wireless device to detect the at least one service performance/QoS event.

In an example, the monitoring of the service performance/QoS may comprises at least one of: monitoring first service performance/QoS between the UPF and the wireless device based on an internet control message protocol (ICMP) echo function; monitoring second service performance/QoS between the UPF and a (R)AN based on the ICMP echo function; or the UPF may send to the (R)AN a request message indicating a request to monitor third service performance/QoS between the (R)AN and the wireless device.

In an example, an AF may send to a PCF a first message indicating a request to subscribe to at least one service performance/QoS event for a service data flow, a service/application, a PDU session, and/or a wireless device, wherein the first message comprises at least one of: at least one first information element (IE) indicating the at least one service performance/QoS event; at least one second IE indicating service performance/QoS values comprising at least one of: a first end-to-end latency; a first jitter; a first survival time; a first communication service availability; a first reliability value; or a first user experienced data rate; at least one third IE indicating a template of a service data flow; at least one fourth IE indicating a first identifier of service/application; at least one fifth IE indicating a second identifier of a PDU session; or at least one six IE indicating a user identity of a wireless device.

In an example, the AF may receive from the PCF the response message to the first message.

In an example, AF may receive from the PCF a measurement report message indicating that the at least one service performance/QoS event is triggered for at least one of: the service data flow; the service/application; the PDU session; and the wireless device; wherein the measurement report message may comprise at least one service performance/QoS value comprising at least one of the following: a second end-to-end latency; a second jitter; a second survival time; a second communication service availability; a second reliability; or a second user experienced data rate.

In an example, the AF may adjust the service behavior accordingly in a timely manner and/or determine the application parameter(s) based on the at least one service performance/QoS value. And the AF may send to the PCF a message for the changing of the application parameter(s).

In an example, the SMF may receive from a PCF a first message indicating a request for at least one service performance/QoS report for a service data flow, a service/application, a PDU session, and/or a wireless device, wherein the first message comprises at least one of: at least one first information element (IE) indicating the at least one service performance/QoS report; at least one second IE indicating service performance/QoS types to report, the service performance/QoS types comprising at least one of: a first end-to-end latency; a first jitter; a first survival time; a first communication service availability; a first reliability value; or a first user experienced data rate; at least one third IE indicating a template of a service data flow; at least one fourth IE indicating a first identifier of service/application; at least one fifth IE indicating a second identifier of a PDU session; or at least one six IE indicating a user identity of a wireless device;

In an example, in response to the first message, the SMF may send to a UPF a second message indicating the request for the at least one service performance/QoS report.

In an example, the SMF may receive from the UPF a response message to the second message, wherein the response message comprises at least one service performance/QoS measurement value for the service data flow, the service/application, the PDU session, and/or the wireless device, the at least one service performance/QoS measurement value indicating at least one of: a second end-to-end latency; a second jitter; a second survival time; a second communication service availability; a second reliability; or a second user experienced data rate.

In an example, the SMF may send to the PCF a third message comprising the at least one service performance/QoS measurement values.

In an example, an AF may send to a PCF a first message indicating a request for at least one service performance/QoS report for a service data flow, a service/application, a PDU session, and/or a wireless device, wherein the first message comprises at least one of: at least one first information element (IE) indicating the at least one service performance/QoS report; at least one second IE indicating service performance/QoS types comprising at least one of: a first end-to-end latency; a first jitter; a first survival time; a first communication service availability; a first reliability value; or a first user experienced data rate; at least one third IE indicating a template of a service data flow; at least one fourth IE indicating a first identifier of service/application; at least one fifth IE indicating a second identifier of a PDU session; or at least one six IE indicating a user identity of a wireless device.

In an example, in response to the first message, the AF may receive from the PCF a response message comprising at least one service performance/QoS measurement value for the service data flow, the service/application, the PDU session, and/or the wireless device, the at least one service performance/QoS measurement value comprising at least one of: a second end-to-end latency; a second jitter; a second survival time; a second communication service availability; a second reliability; or a second user experienced data rate; and determining by the AF, to adjust the application parameter(s) based on the at least one service performance/QoS measurement value.

In an example, an SMF may receive from a PCF a first message indicating a request for at least one service performance/QoS report for a service data flow, a service/application, a PDU session, and/or a wireless device, wherein the first message comprises at least one of: at least one first information element (IE) indicating the at least one service performance/QoS report; at least one second IE indicating service performance/QoS types to report, the service performance/QoS types comprising at least one of: a first end-to-end latency; a first jitter; a first survival time; a first communication service availability; a first reliability value; or a first user experienced data rate; at least one third IE indicating a template of a service data flow; at least one fourth IE indicating a first identifier of service/application; at least one fifth IE indicating a second identifier of a PDU session; or at least one six IE indicating a user identity of a wireless device.

In an example, in response to the first message, the SMF may send to an AMF a second message indicating the request for the at least one service performance/QoS report.

In an example, the AMF may send to (R)AN in response to the second message, a third message indicating the request for the at least one service performance/QoS report.

In an example, the AMF may receive from the (R)AN a first response message to the third message, wherein the first response message comprises at least one service performance/QoS measurement value for the service data flow, the service/application, the PDU session, and/or the wireless device, the at least one service performance/QoS measurement value indicating at least one of: a second end-to-end latency; a second jitter; a second survival time; a second communication service availability; a second reliability; or a second user experienced data rate.

In an example, the SMF may receive from the AMF a second response message to the second message, wherein the second response message comprises the at least one service performance/QoS measurement value.

In an example, the SMF may send to the PCF a fourth message comprising the at least one service performance/QoS measurement value.

In an example, the (R)AN may measure service performance/QoS of the service data flow, the service/application, the PDU session, and/or the wireless device based on at least one of: an internet control message protocol (ICMP) echo function between the (R)AN and a UPF; or the ICMP echo function and/or a PDCP function between (R)AN the wireless device.

Example 5

Figure 17:
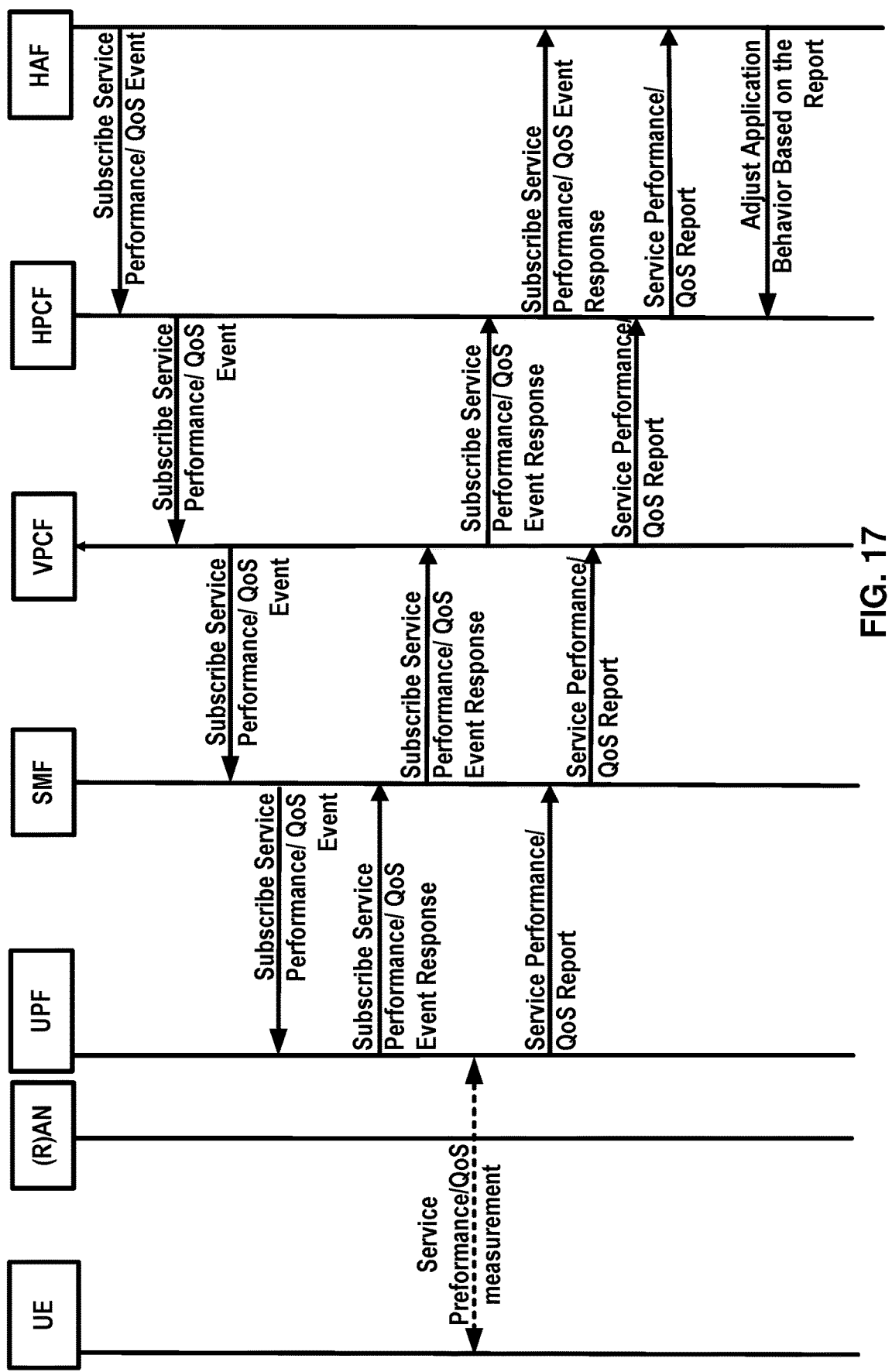
FIG. 17 is an example call flow diagram as per an aspect of an embodiment of the present disclosure.

In an example, a wireless device may be in a visited network and an application server (e.g. Home AF (HAF)) may be in a home network. For home routed roaming scenario, the wireless device may send user data from the visited network to the application server in the home network. The HAF may send a first message to a network node (e.g. HPCF, or HNEF). The first message may indicate a request to subscribe to at least one service performance/QoS event for a service data flow, a service/application, a PDU session, and/or a wireless device. The HPCF may further subscribe the event to a VPCF where the VPCF may be in a visited network. FIG. 17 shows an example call flow which may comprise one or more actions.

An HAF (application server) may send to a network function (e.g. home PCF, or home NEF) a message (e.g. subscribe service performance/QoS event, or application/service information provision) to subscribe to at least one service performance/QoS event for a service data flow, a service/application, a PDU session, and/or a wireless device. As an example, the HAF may send to the HPCF an HTTP POST message to subscribe to at least one service performance/QoS event. The message may comprise one or more information elements. In an example, the message comprises a first information element indicating service performance/QoS event trigger(s). The HAF may request a network function (e.g. HPCF) who receives the event trigger(s) to report the current value(s) of service performance/QoS if value(s) of service performance/QoS has(have) changed and/or the value(s) is(are) below threshold(s) (e.g. requested service performance/QoS values(s)). As an example, the current value of service performance/QoS may be the value(s) of service performance/QoS if value(s) of service performance/QoS has(have) changed and/or the value(s) is(are) below threshold(s) (e.g. requested service performance/QoS) values(s)). In an example, the message comprises a second information element indicating requested service performance/QoS value(s), and this information element (IE) may be used to indicate requested service performance/QoS by the HAF, which may comprise one or more of the following parameters. In an example, the second information element comprises a parameter indicating end-to-end latency. The end-to-end latency may be the time that takes to transfer a given piece of information from a source to a destination. As an example, the end-to-end latency between the wireless device and the application server/controller of discrete automation—motion control may be 1 ms. In an example, the second information element comprises a parameter indicating jitter. The jitter may be a variation time in the delay of received packets. As an example, the jitter of discrete automation—motion control may be 1 µs. In an example, the second information element comprises a parameter indicating survival time. The survival time may be the time that an application consuming a communication service may continue without an anticipated message. As an example, the survival time of discrete automation—motion control may be 0 ms. In an example, the second information element comprises a parameter indicating communication service availability. The communication service availability may be dependable or reliable of service interfaces. As an example, the communication service availability of discrete automation—motion control may be 99,9999%. In an example, the second information element comprises a parameter indicating reliability. The reliability may be dependable or reliable of a given network node. As an example, the reliability of discrete automation—motion control may be 99,9999%. In an example, the second information element comprises a parameter indicating user experienced data rate. The user experienced data rate may be the minimum data rate required to achieve a sufficient quality experience. As an example, the user experienced data rate of discrete automation—motion control may be 1 Mbps up to 10 Mbps. In an example, the message comprises a third information element indicating service data flow template. The service data flow template may be used to detect the service data flow (s) for the service performance/QoS event. In an example, the message comprises a fourth information element indicating service/application identifier. The service/application identifier may be used to detect the service/application for the service performance/QoS event. In an example, the message comprises a fifth information element indicating PDU session identifier. The PDU session identifier may be the identifier of a PDU session applied to the service performance/QoS event. In an example, the message comprises a sixth information element indicating user identity of a wireless device. The user identity of a wireless device may be the identity of a wireless device applied to the service performance/QoS event. If the HAF sends to the HNEF above message (e.g. subscribe service performance/QoS event, or application/service information provision), as an example, the HNEF may forward the message to the HPCF.

In response to the message received from the HAF or HNEF, the HPCF may take one or more actions. In an example action, the HPCF makes the policy decision based on the information (e.g. requested service performance/QoS value (s)) received from the HAF or HNEF. In an example action, the HPCF sends to visited PCF (VPCF) a message (e.g. subscribe service performance/QoS event, or Nsmf_EventExposure_Subscribe) to subscribe event trigger(s) and/or provision the policy(s) (e.g. QoS policy(s)). The message may comprise the information received from the HAF or HNEF. As an example, the message sent to the VPCF may comprise the information (e.g. requested service performance/QoS value (s)) received from the HAF or HNEF and/or policy(s) (e.g. QoS policy) made by the HPCF. As an example, the message sent to the VPCF may comprise the policy(s) (e.g. QoS policy) made by the HPCF, where the policy(s) may comprise the information (e.g. requested service performance/QoS value (s)) received from the HAF or HNEF.

In response to the message received from the HPCF, the VPCF may take one or more actions. In an example, the VPCF makes the policy decision based on the information (e.g. requested service performance/QoS value (s)) received from the HPCF; As an example, the created policy(s) from the VPCF may be the same as the policy(s) received from the HPCF; as an example, the created policy(s) from the VPCF may be different with the policy(s) received from the HPCF. In an example, the VPCF sends to an SMF a message (e.g. subscribe service performance/QoS event, or Nsmf_EventExposure_Subscribe) to subscribe event trigger(s) and/or provision the policy(s) (e.g. QoS policy(s)). The SMF may be in the visited network. The message may comprise the information received from the HPCF. As an example, the message sent to the SMF may comprise the information (e.g. requested service performance/QoS value (s)) received from the HPCF and/or policy(s) (e.g. QoS policy). As an example, the message sent to the SMF may comprise the policy(s) (e.g. QoS policy), where the policy(s) may comprise the information (e.g. requested service performance/QoS value (s)) received from the HPCF.

In response to the message received from the VPCF, the SMF may send to a UPF a message (e.g. subscribe service performance/QoS event, or N4 session establishment/modification request) to subscribe event trigger(s) and/or provision the policy(s) (e.g. QoS policy(s)). The UPF may be in the visited network. The message may comprise the information received from the VPCF. As an example, the message sent to the UPF may comprise the information (e.g. requested service performance/QoS value (s)) received from the VPCF and/or policy(s) (e.g. QoS policy). As an example, the message sent to the UPF may comprise the policy(s) (e.g. QoS policy), where the policy(s) may comprise the information (e.g. requested service performance/QoS value (s)) received from the VPCF. In response to the message received from the SMF, the UPF may send to the SMF a response message (e.g. subscribe service performance/QoS event response, or N4 session establishment/modification response). In response to the message received from the UPF, the SMF may send to the VPCF a response message (e.g. subscribe service performance/QoS event response, or Nsmf_EventExposure_Subscribe response). In response to the message received from the SMF, the VPCF may send to the HPCF a response message (e.g. subscribe service performance/QoS event response, or Nsmf_EventExposure_Subscribe response). In response to the message received from the VPCF, the HPCF may send to the HAF a response message (e.g. subscribe service performance/QoS event response, or application/service information provision response). As an example, the HPCF may send to the HAF a HTTP 201 CREATED message in response to the HTTP POST message.

In response to the message received from the SMF, the UPF may take one or more actions. In an example action, the UPF monitors the service performance/QoS for the service data flow(s), the service/application, the PDU session, and/or the wireless device to measure/detect the at least one service performance/QoS event. The UPF may take one or more ways to measure/detect the service performance/QoS. In an example way, the UPF monitors service performance/QoS between the UPF and the wireless device based on an internet control message protocol (ICMP) echo function. As an example, the UPF may send to the wireless device ping packet(s) and calculate the service performance/QoS value (s) (e.g. end-to-end latency, jitter) after receiving the response from the wireless device. In an example way, the UPF monitors service performance/QoS between the UPF and (R)AN based on the ICMP echo function. As an example, the UPF may send to the (R)AN ping packet(s) and calculate the service performance/QoS value (s) (e.g. end-to-end latency, jitter) after receiving the response(s) from the (R)AN. FIG. 15 is an example call flow that UPF measures service performance/QoS by ICMP echo function. In an example way, the UPF queries service performance/QoS between the (R)AN and the wireless device. As an example, the UPF may send to the (R)AN a signaling message to query the service performance/QoS value(s) between the (R)AN and the wireless device, the (R)AN may measure/detect the performance/QoS value(s) between the (R)AN and the wireless device, and send to the UPF a response message comprising the service performance/QoS value(s). As an example, the UPF may send to the (R)AN a user plane data packet (e.g. in the header of the data packet) comprising an indication to query the service performance/QoS value(s) between the (R)AN and the wireless device, and/or the service performance/QoS value(s) between the wireless device and the application server. The (R)AN may measure/detect the performance/QoS value(s) between the (R)AN and the wireless device, and/or the (R)AN may request the wireless device to measure the service performance/QoS value(s) between the wireless device and the application server. The (R)AN may send to the UPF a user plane data packet (e.g. in the header of the data packet) comprising the measured service performance/QoS value(s). In an example way, the UPF monitors service performance/QoS between the UPF and the application server based on an internet control message protocol (ICMP) echo function. As an example, the UPF may send to the application server ping packet(s) and calculate the service performance/QoS value (s) (e.g. end-to-end latency, jitter) after receiving the response from the wireless device. In an example action, the UPF sends to the SMF a message (e.g. service performance/QoS measurement report) if the UPF detects at least one service performance/QoS event is triggered (e.g. value(s) of service performance/QoS has(have) changed and/or the value(s) is(are) below threshold(s) (e.g. requested service performance/QoS)) for at least one of: the service data flow; the service/application; the PDU session; and the wireless device. The message sent to the SMF from the UPF may comprise one or more information elements. In an example, the message comprises a first information element indicating service performance/QoS event trigger(s). In an example, the message sent to the SMF from the UPF comprises a second information element indicating measured service performance/QoS value (s), and the measured service performance/QoS value (s) may be used to indicate measured service performance/QoS by a network function (e.g. UPF), which may comprise one or more parameters. In an example, the second information element may comprise a parameter indicating service performance/QoS value type, and this parameter may be used to indicate the type or scope of the service performance/QoS. As an example, this parameter may comprise one or more of the following types. service performance/QoS value (e.g. end-to-end latency) between UPF and wireless device. service performance/QoS value (e.g. end-to-end latency) between UPF and (R)AN. service performance/QoS value (e.g. end-to-end latency) between (R)AN and wireless device. service performance/QoS value (e.g. end-to-end latency) between UPF and application server. service performance/QoS value (e.g. end-to-end latency) between UE and application server. In an example, the second information element may comprise a parameter indicating measured end-to-end latency. In an example, the second information element may comprise a parameter indicating measured jitter. In an example, the second information element may comprise a parameter indicating measured survival time. In an example, the second information element may comprise a parameter indicating measured communication service availability. In an example, the second information element may comprise a parameter indicating measured reliability. In an example, the second information element may comprise a parameter indicating measured user experienced data rate. In an example, the message sent to the SMF from the UPF comprises a third information element indicating service data flow template. In an example, the message sent to the SMF from the UPF comprises a fourth information element indicating service/application identifier. In an example, the message sent to the SMF from the UPF comprises a fifth information element indicating PDU session identifier. In an example, the message sent to the SMF from the UPF comprises a sixth information element indicating user identity of a wireless device.

In response to the message received from the UPF, the SMF may send to the VPCF a message (e.g. service performance/QoS measurement report) comprising the information received from the UPF. In response to the message received from the SMF, the VPCF may send to the HPCF a message (e.g. service performance/QoS measurement report) comprising the information received from the SMF. In response to the message received from the VPCF, the HPCF may send to the HAF or HNEF a message (e.g. service performance/QoS measurement report) comprising the information received from the VPCF. In case of the HNEF receives the message (e.g. service performance/QoS measurement report) from the HPCF, the HNEF may forward the message to the HAF.

In response to the message received from the HPCF or HNEF, the HAF may adjust the service behavior accordingly in a timely manner based on the information (e.g. service performance/QoS value (s) event trigger, and/or measured service performance/QoS value (s)) received from the HPCF or HNEF. As an example, the HAF may change the codec rate of the video based on the measured service performance/QoS value (s) (e.g. the current service performance of the communication system may not be able to support the 8k Ultra High Definition (UHD) video, the codec rate of the video may be changed to 4K UHD). The HAF may send to the HPCF a message (e.g. application/service information provision) for the changing of application information. As an example, the HAF may analysis which part of delay (e.g. from wireless device to access network, access network to core network, or core network to the application server) may be the reason causing a long end-to-end delay between application server and the wireless device. As an example, the HAF may determine that the end-to-end delay may be caused by the delay between the core network and the application server, the HAF may send to the HPCF a message (e.g. HTTP PUT) indicating the changing of the route policy between the core network (e.g. UPF) and the application server. The HPCF may send to the VPCF a policy to select a better route which has short delay between UPF and the application server compare to the current end-to-end delay; the VPCF may forward the received policy to the SMF, and the SMF may send to the policy to the UPF for enforcement.

Example 6

Figure 18:
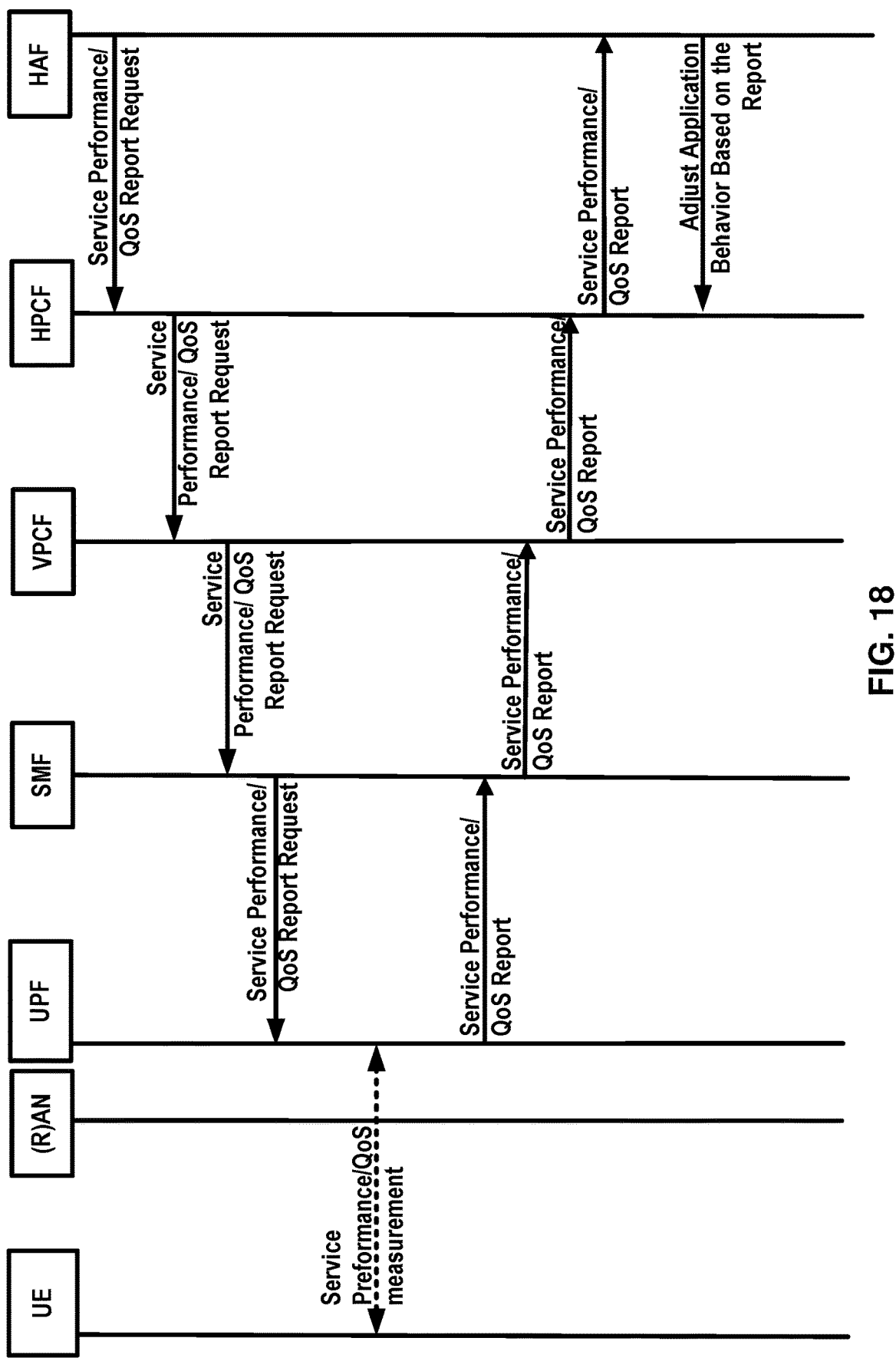
FIG. 18 is an example call flow diagram as per an aspect of an embodiment of the present disclosure.

In an example, an application server (e.g. HAF), HPCF and/or HNEF may be in the home network; VPCF, SMF, UPF, (R)AN and/or wireless device may be in the visited network. The HAF may send a first message to a network node (e.g. HPCF, or HNEF). The first message may indicate a request for at least one service performance/QoS report for a service data flow, a service/application, a PDU session, and/or a wireless device. FIG. 18 shows an example call flow which may comprise one or more actions.

An HAF may send to a network function (e.g. HPCF, or HNEF) a message (e.g. service performance/QoS report request, or application/service information provision) to indicate the HPCF or HNEF reporting at least one current service performance/QoS for a service data flow, a service/application, a PDU session, and/or a wireless device. The message may comprise one or more information elements. In an example, the message comprises a first information element comprising service performance/QoS report indication(s), and this indication may be used to by the HAF to query current value(s) of one or more of the following parameters for service performance/QoS: end-to-end latency; jitter; survival time; communication service availability; reliability; and user experienced data rate. As an example, a network function (e.g. UPF) may measure the current value(s) of service performance/QoS parameters when receiving the service performance/QoS report indication(s). In an example, the message comprises a second information element indicating service data flow template. In an example, the message comprises a third information element indicating service/application identifier. In an example, the message comprises a fourth information element indicating PDU session identifier. In an example, the message comprises a fifth information element indicating user identity of a wireless device. If the HAF sends to the HNEF above message (e.g. service performance/QoS report request, or application/service information provision), as an example, the HNEF may forward the message to the HPCF.

In response to the message received from the HAF or HNEF, the HPCF may take one or more actions. In an example action, the HPCF makes the policy decision based on the information received from the HAF or HNEF. In an example action, the HPCF sends to a VPCF a message (e.g. service performance/QoS report request) to request at least one current service performance/QoS report. The message may comprise the information received from the HAF or HNEF. As an example, the message sent to the VPCF may comprise the information (e.g. service performance/QoS report indication(s)) received from the HAF or HNEF and/or policy(s) (e.g. QoS policy). As an example, the message sent to the VPCF may comprise the policy(s) (e.g. QoS policy), where the policy(s) may comprise the information (e.g. service performance/QoS report indication(s)) received from the HAF or HNEF.

In response to the message received from the HPCF, the VPCF may take one or more of actions. In an example action, the VPCF makes the policy decision based on the information received from the HPCF; As an example, the created policy(s) from the VPCF may be the same as the policy(s) received from the HPCF; as an example, the created policy(s) from the VPCF may be different with the policy(s) received from the HPCF. In an example action, the VPCF sends to an SMF a message (e.g. service performance/QoS report request) to request at least one current service performance/QoS report. The message may comprise the information received from the HPCF. As an example, the message sent to the SMF may comprise the information (e.g. service performance/QoS report indication(s)) received from the HPCF and/or policy(s) (e.g. QoS policy). As an example, the message sent to the SMF may comprise the policy(s) (e.g. QoS policy), where the policy(s) may comprise the information (e.g. service performance/QoS report indication(s)) received from the HPCF.

In response to the message received from the VPCF, the SMF may send to a UPF a message (e.g. service performance/QoS report request, or N4 session establishment/modification request) to request the current service performance/QoS report and/or provision the policy(s) (e.g. QoS policy(s)). The message may comprise the information received from the VPCF. As an example, the message sent to the UPF may comprise the information (e.g. service performance/QoS report indication(s)) received from the VPCF and/or policy(s) (e.g. QoS policy). As an example, the message sent to the UPF may comprise the policy(s) (e.g. QoS policy), where the policy(s) may comprise the information (e.g. service performance/QoS report indication(s)) received from the VPCF.

In response to the message received from the SMF, the UPF may take one or more actions. In an example action, the UPF monitors the service performance/QoS of the service data flow(s), the service/application, the PDU session, and/or the wireless device to measure/detect the at least one service performance/QoS event. The UPF may take one or more ways to measure/detect the service performance/QoS. In an example way, the UPF monitors service performance/QoS between the UPF and the wireless device based on an internet control message protocol (ICMP) echo function. As an example, the UPF may send to the wireless device ping packet(s) and calculate the service performance/QoS value (s) (e.g. end-to-end latency, jitter) after receiving the response from the wireless device. In an example way, the UPF monitors service performance/QoS between the UPF and a (R)AN based on the ICMP echo function. As an example, the UPF may send to the (R)AN ping packet(s), and calculate the service performance/QoS value (s) (e.g. end-to-end latency, jitter) after receiving the response(s) from the (R)AN. In an example way, the UPF queries service performance/QoS between the (R)AN and the wireless device. As an example, the UPF may send to the (R)AN a signaling message to query the service performance/QoS value(s) between the (R)AN and the wireless device, the (R)AN may measure/detect the performance/QoS value(s) between the (R)AN and the wireless device, and send to the UPF a response message comprising the service performance/QoS value(s). As an example, the UPF may send to the (R)AN a user plane data packet (e.g. in the header of the data packet) comprising an indication to query the service performance/QoS value(s) between the (R)AN and the wireless device, the (R)AN may measure/detect the performance/QoS value(s) between the (R)AN and the wireless device, and send to the UPF a user plane data packet (e.g. in the header of the data packet) comprising the service performance/QoS value(s). In an example action, the UPF may send to the SMF a report message (e.g. service performance/QoS measurement report, or N4 session establishment/modification response), and the report message may comprise one or more information elements. In an example, the report message comprises a first information element indicating measured service performance/QoS value (s). The first information element may be used to indicate measured service performance/QoS, which may comprise one or more parameters. In an example, the first information element comprises a parameter indicating service performance/QoS value type, and this parameter may be used to indicate the type or scope of the service performance/QoS. As an example, this parameter may comprise one or more of the following types: service performance/QoS value (e.g. end-to-end latency) between UPF and wireless device; service performance/QoS value (e.g. end-to-end latency) between UPF and (R)AN; service performance/QoS value (e.g. end-to-end latency) between (R)AN and wireless device; service performance/QoS value (e.g. end-to-end latency) between UPF and application server; and service performance/QoS value (e.g. end-to-end latency) between UE and application server. In an example, the first information element comprises a parameter indicating measured end-to-end latency. In an example, the first information element comprises a parameter indicating measured jitter. In an example, the first information element comprises a parameter indicating measured survival time. In an example, the first information element comprises a parameter indicating measured communication service availability. In an example, the first information element comprises a parameter indicating measured reliability. In an example, the first information element comprises a parameter indicating measured user experienced data rate. In an example, the report message comprises a second information element indicating service data flow template. In an example, the report message comprises a third information element indicating service/application identifier. In an example, the report message comprises a fourth information element indicating PDU session identifier. In an example, the report message comprises a fifth information element indicating user identity of a wireless device.

In response to the message received from the UPF, the SMF may send to the VPCF a message (e.g. service performance/QoS measurement report) comprising the information received from the UPF. In response to the message received from the SMF, the VPCF may send to the HPCF a message (e.g. service performance/QoS measurement report) comprising the information received from the SMF. In response to the message received from the VPCF, the HPCF may send to the HAF or HNEF a message (e.g. service performance/QoS measurement report) comprising the information received from the VPCF. In case of the HNEF receives the message (e.g. service performance/QoS measurement report) from the HPCF, the HNEF may forward the message to the HAF.

In response to the message received from the HPCF or HNEF, the HAF may adjust the service behavior accordingly in a timely manner based on the information (e.g. measured service performance/QoS value (s)) received from the HPCF or HNEF. As an example, the AF may change the codec rate of the video based on the measured service performance/QoS value (s) (e.g. the current service performance of the communication system may not be able to support the 8k Ultra High Definition (UHD) video, the codec rate of the video may be changed to 4K UHD). The AF may send to the PCF a message (e.g. application/service information provision) for the changing of application information. As an example, the HAF may analysis which part of delay (e.g. from wireless device to access network, access network to core network, or core network to the application server) may be the reason causing a long end-to-end delay between application server and the wireless device. As an example, the HAF may determine that the end-to-end delay may be caused by the delay between the core network and the application server, the HAF may send to the HPCF a message (e.g. HTTP PUT) indicating the changing of the route policy between the core network (e.g. UPF) and the application server. The HPCF may send to the VPCF a policy to select a better route which has short delay between UPF and the application server compare to the current end-to-end delay; the VPCF may forward the received policy to the SMF, and the SMF may send to the policy to the UPF for enforcement.

In an example, a home PCF (HPCF) may receive from a home AF (HAF) a first message indicating a request to subscribe to at least one service performance/QoS event for a service data flow, a service/application, a PDU session, and/or a wireless device, wherein the first message comprises at least one of: at least one first information element (IE) indicating the at least one service performance/QoS event; at least one second IE indicating service performance/QoS values comprising at least one of: a first end-to-end latency; a first jitter; a first survival time; a first communication service availability; a first reliability value; or a first user experienced data rate; at least one third IE indicating a template of a service data flow; at least one fourth IE indicating a first identifier of service/application; at least one fifth IE indicating a second identifier of a PDU session; or at least one six IE indicating a user identity of a wireless device.

In an example, the HPCF may send to a visited PCF (VPCF) and in response to the first message a second message indicating the request to subscribe to the at least one service performance/QoS event. In an example, the HPCF may receive from the VPCF a response message to the second message. In an example, the HPCF may send to the HAF a response message to the first message.

In an example, the HPCF may receive from the VPCF a service performance/QoS report message indicates that the at least one service performance/QoS event is triggered for one of: the service data flow; the service/application; the PDU session; and the wireless device; wherein the report message comprises at least one service performance/QoS value comprising at least one of the following: a second end-to-end latency; a second jitter; a second survival time; a second communication service availability; a second reliability; or a second user experienced data rate.

In an example, the HPCF may send to the HAF a third message comprising the at least one service performance/QoS value. In an example, the HPCF may receive from the HAF a fourth message in response to the third message, comprising the updated application parameters.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

FIG. 19 is a flow diagram of an aspect of an embodiment of the present disclosure. At 1910, a user plane function may receive a first message from a session management function. The first message may request at least one quality of service (QoS) report for a data flow of a wireless device. The first message may comprise a first information element indicating a QoS event. The first message may comprise a second information element indicating a latency value for the QoS event. At 1920, a user plane function may send to the wireless device, monitoring packets for monitoring a packet transmission latency of the data flow. At 1930, the user plane function may determine an occurrence of the QoS event based on the packet transmission latency of the data flow and the latency value. At 1940, the user plane function may send to the session management function, a second message may comprise a third information element indicating the occurrence of the QoS event for the data flow.

According to an example embodiment, the session management function may receive a third message from a policy control function. The third message may request to subscribe to the QoS event for the data flow. The third message may comprise a third information element indicating the QoS event. The third message may comprise a fourth information element indicating QoS values may comprise an end-to-end latency. According to an example embodiment, the fourth information element may comprise a jitter. According to an example embodiment, the fourth information element may comprise a survival time. According to an example embodiment, the fourth information element may comprise a communication service availability. According to an example embodiment, the fourth information element may comprise a reliability value. According to an example embodiment, the fourth information element may comprise a user experienced data rate.

According to an example embodiment, the third message may comprise a fifth information element indicating a template of a service data flow. According to an example embodiment, the third message may comprise a sixth information element indicating an identifier of service/application. According to an example embodiment, the third message may comprise a seventh information element indicating an identifier of a PDU session. According to an example embodiment, the third message may comprise an eighth information element indicating a user identity of a wireless device. According to an example embodiment, the third message may comprise the session management function may send to the policy control function, a fourth message responding to the third message.

According to an example embodiment, the policy control function may receive a fifth message from an application function. The fifth message may request to subscribe to the QoS event for the data flow. The fifth message may comprise a fifth information element indicating the QoS event. The fifth message may comprise a sixth information element indicating QoS values comprising the end-to-end latency.

According to an example embodiment, the sixth information element may comprise a jitter. According to an example embodiment, the sixth information element may comprise a survival time. According to an example embodiment, the sixth information element may comprise a communication service availability. According to an example embodiment, the sixth information element may comprise a reliability value. According to an example embodiment, the sixth information element may comprise a user experienced data rate. According to an example embodiment, the fifth message may comprise a seventh information element indicating a template of a service data flow. According to an example embodiment, the fifth message may comprise an eighth information element indicating an identifier of service/application. According to an example embodiment, the fifth message may comprise a ninth information element indicating an identifier of a PDU session. According to an example embodiment, the fifth message may comprise a tenth information element indicating a user identity of a wireless device. According to an example embodiment, the policy control function may send to the application function, a sixth message responding to the fifth message.

According to an example embodiment, the second information element further may comprise a first value of a jitter. According to an example embodiment, a user plane function may monitor and measure a second value of the jitter. According to an example embodiment, the user plane function may determine an occurrence of the QoS event based on the first value and the second value. According to an example embodiment, the second information element further may comprise a first value of a survival time. According to an example embodiment, a user plane function may monitor and measure a second value of the survival time. According to an example embodiment, the user plane function may determine an occurrence of the QoS event based on the first value and the second value. According to an example embodiment, the second information element may comprise a first value of a communication service availability.

According to an example embodiment, a user plane function may monitor and measure a second value of the communication service availability. According to an example embodiment, the user plane function may determine, an occurrence of the QoS event based on the first value and the second value.

According to an example embodiment, the second information element further may comprise a first value of a reliability value. According to an example embodiment, a user plane function may monitor and measure a second value of the reliability value. According to an example embodiment, the user plane function may determine, an occurrence of the QoS event based on the first value and the second value.

According to an example embodiment, the second information element further may comprise a first value of a user experienced data rate. According to an example embodiment, a user plane function may monitor and measure a second value of the user experienced data rate. According to an example embodiment, the user plane function may determine, an occurrence of the QoS event based on the first value and the second value.

According to an example embodiment, the second message may comprise a fourth information element indicating the latency value for the QoS event. According to an example embodiment, the fourth information element may comprise a jitter value for the QoS event. According to an example embodiment, the fourth information element may comprise a survival time value for the QoS event. According to an example embodiment, the fourth information element may comprise a communication service availability value for the QoS event. According to an example embodiment, the fourth information element may comprise a reliability value for the QoS event. According to an example embodiment, the fourth information element may comprise a user experienced data rate value for the QoS event. According to an example embodiment, the session management function may send to a policy control function, a third message comprising the third information element and the fourth information element. According to an example embodiment, the policy control function may send to an application function, a fourth message comprising the third information element and the fourth information element. According to an example embodiment, the application function may adjust service behavior based on the fourth message. According to an example embodiment, the packet transmission latency of the data flow may be between the user plane function and the wireless device. According to an example embodiment, the user plane function may monitor a packet transmission latency between the user plane function and a base station by sending monitoring packets to the base station.

According to an example embodiment, the user plane function may query a packet transmission latency between a base station and the wireless device by sending monitoring packets to the base station. According to an example embodiment, the user plane function may monitor a packet transmission latency between the user plane function and an application server by sending monitoring packets to the application server.

According to an example embodiment, the user plane function may receive a third message from the session management function. The third message may subscribe at least one quality of service (QoS) event for a data flow. The third message may comprise an information element indicating the QoS event. The third message may comprise an information element indicating QoS values may comprise at least one of: an end-to-end latency, a jitter, a survival time, a communication service availability, a reliability value, or a user experienced data rate. According to an example embodiment, an information element indicating a template of a service data flow. According to an example embodiment, an information element indicating an identifier of service/application. According to an example embodiment, an information element indicating an identifier of a PDU session. According to an example embodiment, an information element indicating a user identity of a wireless device.

According to an example embodiment, the session management function may send to an access and mobility management function, a third message subscribing at least one quality of service (QoS) event for a data flow. The third message may comprise a fourth information element indicating the QoS event. The third message may comprise a fifth information element indicating QoS values may comprise an end-to-end latency. According to an example embodiment, the access and mobility management function may send a fourth message to a base station. The fourth message may comprise at least one information element of the third message. According to an example embodiment, the fifth information element may comprise a jitter. According to an example embodiment, the fifth information element may comprise a survival time. According to an example embodiment, the fifth information element may comprise a communication service availability. According to an example embodiment, the fifth information element may comprise a reliability value. According to an example embodiment, the fifth information element may comprise a user experienced data rate. According to an example embodiment, the third message may comprise a sixth information element indicating a template of a service data flow. According to an example embodiment, the third message may comprise a seventh information element indicating an identifier of service/application. According to an example embodiment, the third message may comprise an eighth information element indicating an identifier of a PDU session. According to an example embodiment, the third message may comprise a ninth information element indicating a user identity of a wireless device. According to an example embodiment, the base station may send to the wireless device, monitoring packets for monitoring a packet transmission latency of the data flow. According to an example embodiment, the base station determining an occurrence of the QoS event based on the packet transmission latency of the data flow and the end-to-end latency. According to an example embodiment, the base station may send a fifth message to the access and mobility management function in response to the determining. The fifth message may comprise an information element indicating the occurrence of the QoS event and the packet transmission latency of the data flow. According to an example embodiment, the access and mobility management function may send a sixth message to the session management function. The sixth message may comprise an information element indicating the occurrence of the QoS event and the packet transmission latency of the data flow. According to an example embodiment, the user plane function may monitor a packet transmission latency between the user plane function and a base station by sending monitoring packets to the base station. According to an example embodiment, the user plane function may monitor a packet transmission latency between a base station and the wireless device by sending monitoring packets to the wireless device.

Figure 20:
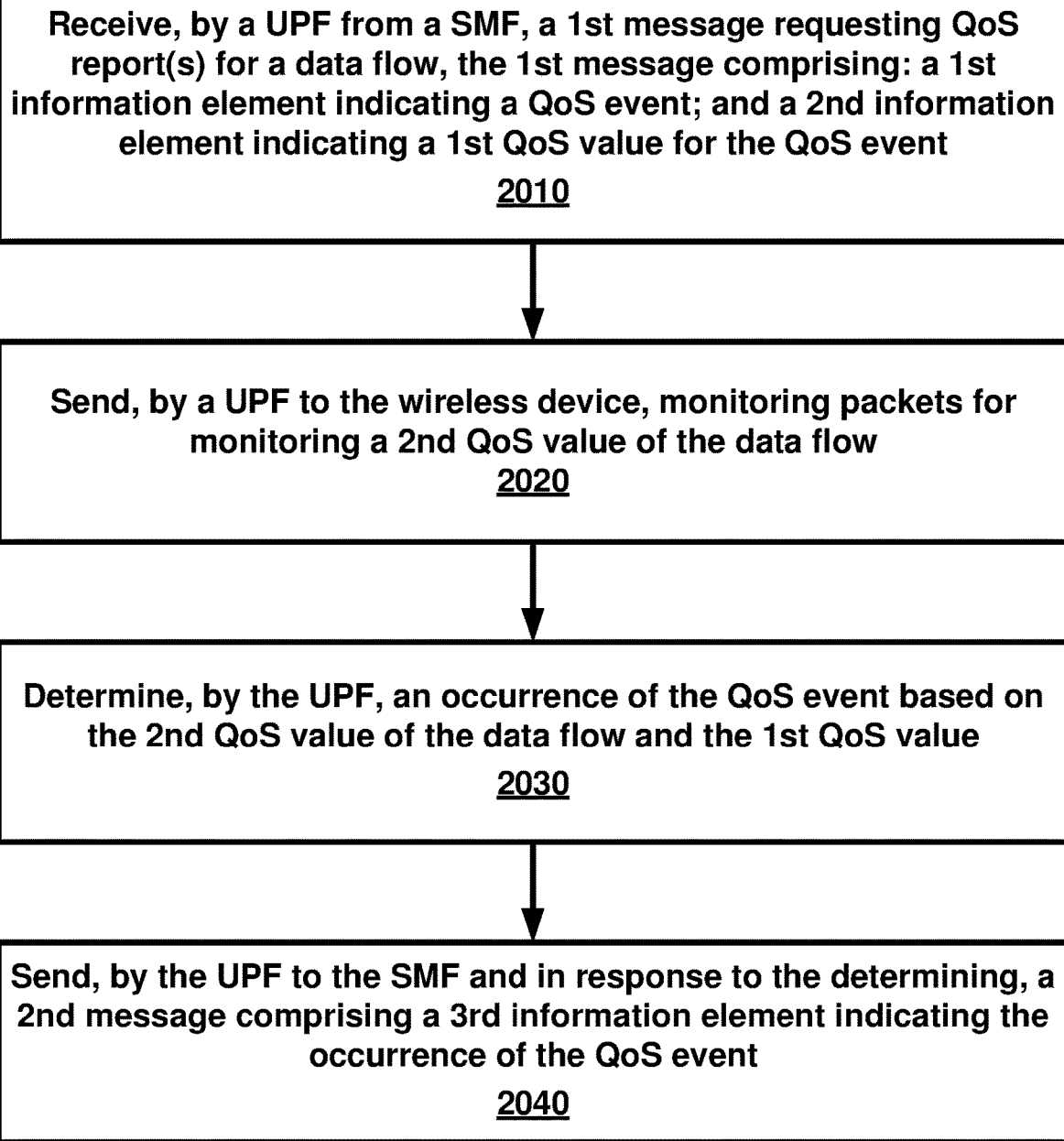
FIG. 20 is an example flow diagram as per an aspect of an embodiment of the present disclosure.

FIG. 20 is a flow diagram of an aspect of an embodiment of the present disclosure. At 2010, a user plane function may receive a first message from a session management function. The first message may request at least one quality of service (QoS) report for a data flow. The first message may comprise a first information element indicating a QoS event. The first message may comprise a second information element indicating a first QoS value for the QoS event. At 2020, a user plane function may send to a wireless device, monitoring packets for monitoring a second QoS value of the data flow. At 2030, the user plane function may determine an occurrence of the QoS event based on the second QoS value of the data flow and the first QoS value. At 2040, the user plane function may send a second message to the session management function in response to the determining. The second message may comprise a third information element indicating the occurrence of the QoS event. According to an example embodiment, the first QoS value and the second QoS value may comprise an end-to-end latency. According to an example embodiment, the first QoS value and the second QoS value may comprise a jitter. According to an example embodiment, the first QoS value and the second QoS value may comprise a survival time. According to an example embodiment, the first QoS value and the second QoS value may comprise a communication service availability. According to an example embodiment, the first QoS value and the second QoS value may comprise a reliability value. According to an example embodiment, the first QoS value and the second QoS value may comprise a user experienced data rate.

Figure 21:
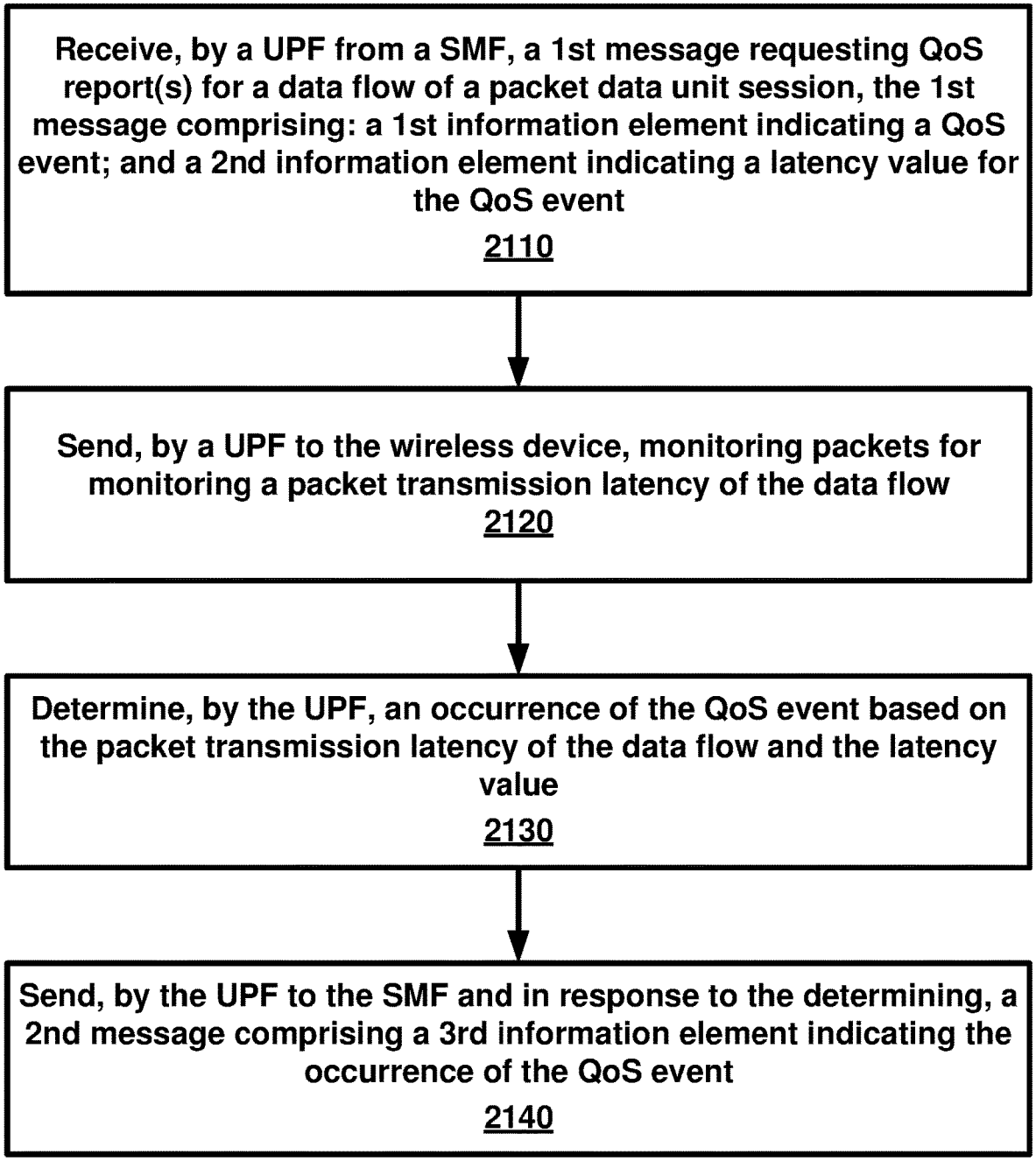
FIG. 21 is an example flow diagram as per an aspect of an embodiment of the present disclosure.

FIG. 21 is a flow diagram of an aspect of an embodiment of the present disclosure. At 2110, a user plane function may receive a first message from a session management function. The first message may request at least one quality of service (QoS) report for a data flow of a packet data unit session. The first message may comprise a first information element indicating a QoS event. The first message may comprise a second information element indicating a latency value for the QoS event. At 2120, a user plane function may send monitoring packets to a wireless device. The monitoring packets may be for monitoring a packet transmission latency of the data flow. At 2130, the user plane function may determine an occurrence of the QoS event based on the packet transmission latency of the data flow and the latency value. At 2140, the user plane function may send a second message to the session management function in response to the determining. The second message may comprise a third information element indicating the occurrence of the QoS event.

Figure 22:
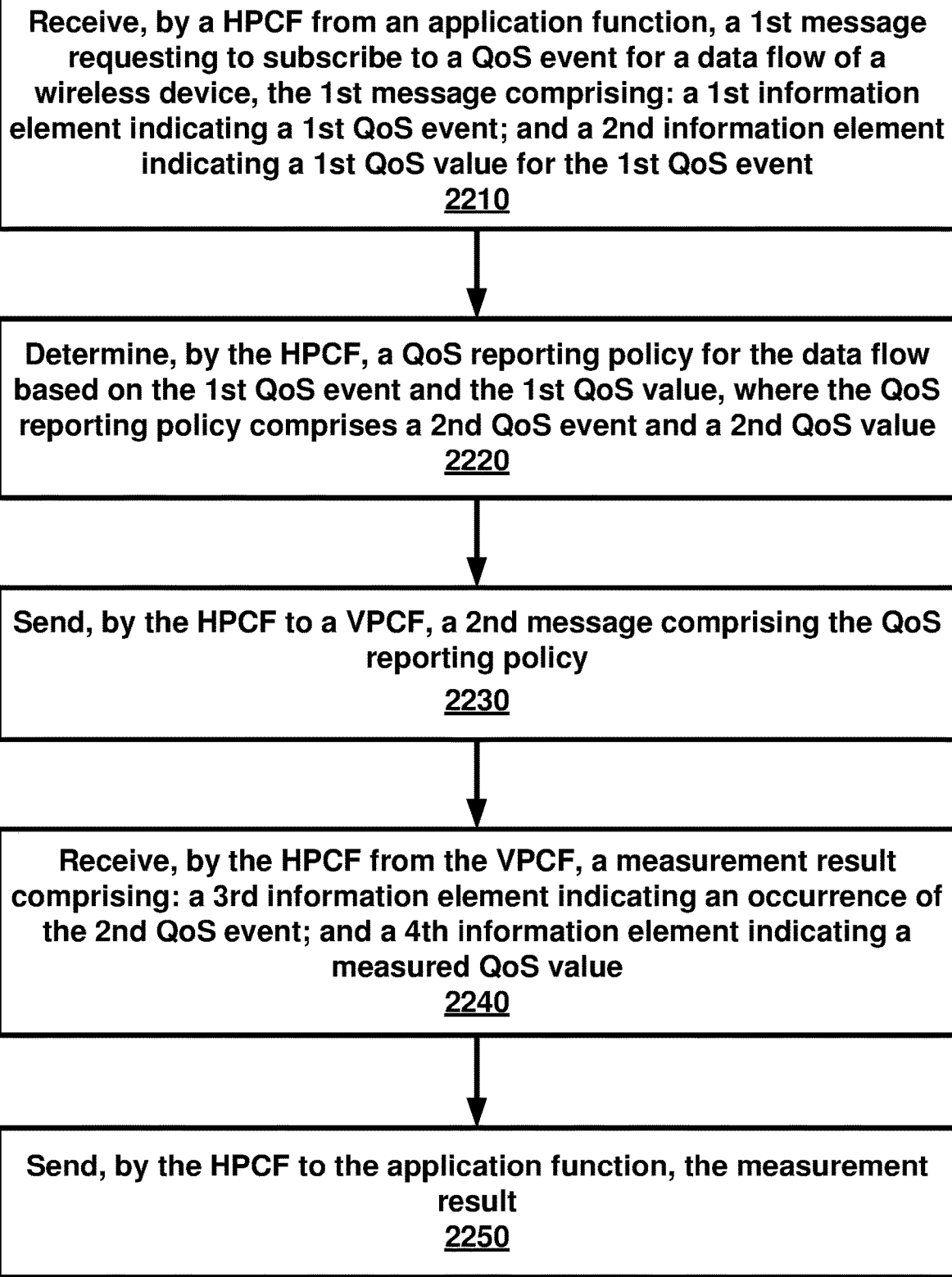
FIG. 22 is an example flow diagram as per an aspect of an embodiment of the present disclosure.

FIG. 22 is a flow diagram of an aspect of an embodiment of the present disclosure. At 2210, a home policy control function (HPCF) may receive a first message from an application function. The first message may request to subscribe to a quality of service (QoS) event for a data flow of a wireless device. The first message may comprise a first information element indicating a first QoS event. The first message may comprise a second information element indicating a first QoS value for the first QoS event. At 2220, the HPCF, may determine a QoS reporting policy for the data flow based on the first QoS event and the first QoS value. The QoS reporting policy may comprise a second QoS event and a second QoS value. At 2230, the HPCF may send a second message to a visited policy control function (VPCF). The second message may comprise the QoS reporting policy. At 2240, the HPCF may receive a measurement result from the VPCF. The measurement result may comprise a third information element indicating an occurrence of the second QoS event. The measurement result may comprise a fourth information element indicating a measured QoS value. At 2250, the HPCF may send the measurement result to the application function.

According to an example embodiment, the occurrence of the second QoS event may be determined based on the measured QoS value and the second QoS value. According to an example embodiment, the first QoS value may comprise an end-to-end latency. According to an example embodiment, the first QoS value may comprise a jitter. According to an example embodiment, the first QoS value may comprise a survival time. According to an example embodiment, the first QoS value may comprise a communication service availability. According to an example embodiment, the first QoS value may comprise a reliability value. According to an example embodiment, the first QoS value may comprise a user experienced data rate. According to an example embodiment, the second QoS value may comprise an end-to-end latency. According to an example embodiment, the second QoS value may comprise a jitter. According to an example embodiment, the second QoS value may comprise a survival time. According to an example embodiment, the second QoS value may comprise a communication service availability. According to an example embodiment, the second QoS value may comprise a reliability value. According to an example embodiment, the second QoS value may comprise a user experienced data rate. According to an example embodiment, the measured QoS value may comprise an end-to-end latency. According to an example embodiment, the measured QoS value may comprise a jitter. According to an example embodiment, the measured QoS value may comprise a survival time. According to an example embodiment, the measured QoS value may comprise a communication service availability. According to an example embodiment, the measured QoS value may comprise a reliability value. According to an example embodiment, the measured QoS value may comprise a user experienced data rate.

According to an example embodiment, a visited session management function may receive a third message from the visited policy control function. The third message may request to subscribe to the QoS event for the data flow. The third message may comprise an information element indicating the second QoS event. The third message may comprise an information element indicating the second QoS value. The second QoS value may comprise an end-to-end latency. The second QoS value may comprise a jitter. The second QoS value may comprise a survival time. The second QoS value may comprise a communication service availability. The second QoS value may comprise a reliability value. The second QoS value may comprise a user experienced data rate. The third message may comprise an information element indicating a template of a service data flow. The third message may comprise an information element indicating an identifier of service/application. The third message may comprise an information element indicating an identifier of a PDU session. The third message may comprise an information element indicating a user identity of a wireless device. The visited session management function may send a fourth message to the visited policy control function in response to the third message.

According to an example embodiment, a visited user plane function may receive a fifth message from the visited session management function. The fifth message may request to subscribe to the QoS event for the data flow. The fifth message may comprise a first information element indicating the second QoS event. The fifth message may comprise a second information element indicating the second QoS value. A visited user plane function may send to the wireless device, monitoring packets for monitoring the second QoS value of the data flow. The visited user plane function may determine an occurrence of the QoS event based on the second QoS value of the data flow and a measured QoS value. The visited user plane function may send a sixth message to the visited session management function. The sixth message may comprise the third information element indicating the occurrence of the QoS event. The sixth message may comprise the fourth information element indicating the measured QoS value. According to an example embodiment, the visited session management function may send a seventh message to the visited policy control function. The seventh message may comprise the third information element and the fourth information element.

According to an example embodiment, the first message may comprise an information element indicating a template of a service data flow. According to an example embodiment, the first message may comprise an information element indicating an identifier of service/application. According to an example embodiment, the first message may comprise an information element indicating an identifier of a PDU session. According to an example embodiment, the first message may comprise an information element indicating a user identity of a wireless device.

According to an example embodiment, the QoS reporting policy and the measurement result may comprise an information element indicating a template of a service data flow. According to an example embodiment, the QoS reporting policy and the measurement result may comprise an information element indicating an identifier of service/application. According to an example embodiment, the QoS reporting policy and the measurement result may comprise an information element indicating an identifier of a PDU session. According to an example embodiment, the QoS reporting policy and the measurement result may comprise an information element indicating a user identity of a wireless device.

According to an example embodiment, the application function may adjust service behavior based on the measurement result. According to an example embodiment, the home policy control function (HPCF) may receive from the application function, a third message querying a QoS event for the data flow. The third message may comprise an information element indicating the first QoS event. The third message may comprise an information element indicating the first QoS value for the first QoS event. The first QoS value may comprise an end-to-end latency. The first QoS value may comprise a jitter. The first QoS value may comprise a survival time. The first QoS value may comprise a communication service availability. The first QoS value may comprise a reliability value. The first QoS value may comprise a user experienced data rate. The third message may comprise an information element indicating a template of a service data flow. The third message may comprise an information element indicating an identifier of service/application. The third message may comprise an information element indicating an identifier of a PDU session. The third message may comprise an information element indicating a user identity of a wireless device. According to an example embodiment, the home policy control function may send to the visited policy control function, a fourth message querying the QoS event for the data flow. The fourth message may comprise at least one of information elements of the third message. According to an example embodiment, the visited policy control function may send to a visited session management function, a fifth message querying the QoS event for the data flow. The fifth message may comprise at least one of information elements of the fourth message. According to an example embodiment, the visited session management function may send to a visited user plane function, a sixth message querying the QoS event for the data flow, the sixth message may comprise at least one of information elements of the fifth message. According to an example embodiment, the visited user plane function may measure a third QoS value. The third QoS value may comprise an end-to-end latency. The third QoS value a jitter. The third QoS value a survival time. The third QoS value a communication service availability. The third QoS value a reliability value. The third QoS value a user experienced data rate. The visited user plane function may send to the visited session management function, a seventh message reporting the third QoS value. According to an example embodiment, the visited session management function may send to the visited policy control function, an eighth message reporting the third QoS value. According to an example embodiment, the visited policy control function may send to the home policy control function, a ninth message reporting the third QoS value. According to an example embodiment, the home policy control function may send to the application function, a tenth message reporting the third QoS value. According to an example embodiment, the application function may adjust service behavior based on the third QoS value.

According to an example embodiment, the visited policy control function may determine a visited QoS reporting policy based on the QoS reporting policy received from the home policy control function. The visited QoS reporting policy may comprise a visited QoS event. The visited QoS reporting policy may comprise a visited QoS value for the visited QoS event. According to an example embodiment, the visited policy control function may send to a visited session management function, a third message may comprise the visited QoS reporting policy.

Figure 23:
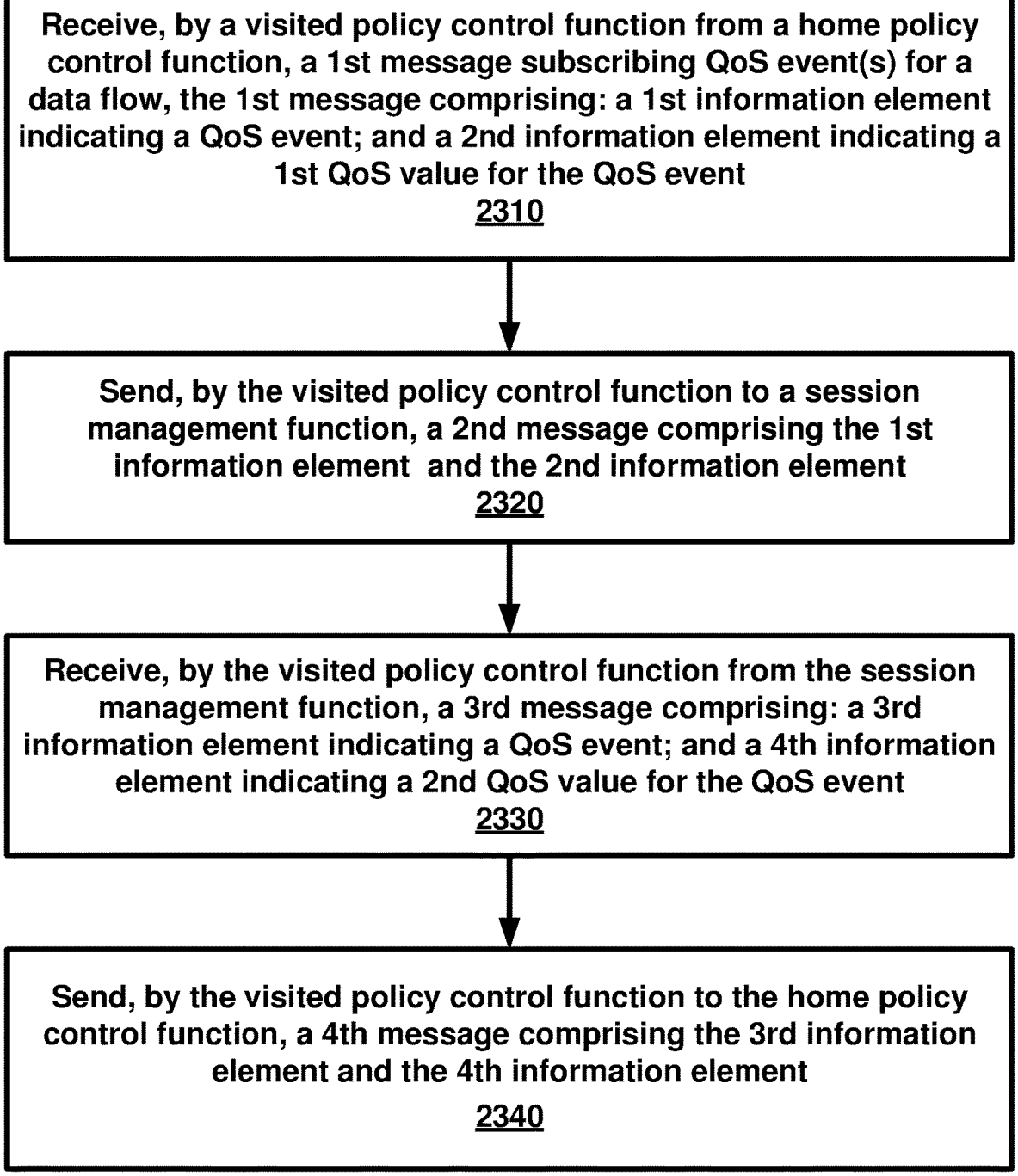
FIG. 23 is an example flow diagram as per an aspect of an embodiment of the present disclosure.

FIG. 23 is a flow diagram of an aspect of an embodiment of the present disclosure. At 2310, a visited policy control function may receive from a home policy control function, a first message subscribing at least one quality of service (QoS) event for a data flow. The first message may comprise a first information element indicating a QoS event. The first message may comprise a second information element indicating a first QoS value for the QoS event. At 2320, the visited policy control function may send a second message to a session management function. The second message may comprise the first information element and the second information element. At 2330, the visited policy control function may receive a third message from the session management function. The third message may comprise a third information element indicating a QoS event. The third message may comprise a fourth information element indicating a second QoS value for the QoS event. At 2340, the visited policy control function may send a fourth message to the home policy control function. The fourth message may comprise the third information element and the fourth information element.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method performed by a user plane function, comprising:
   receiving, from a session management function, a request for at least one quality of service (QoS) report for a data flow, the request indicating:
     a QoS event; and
     a first QoS value for the QoS event;
   sending, to a base station, monitoring packets for monitoring a second QoS value of the data flow;
   determining an occurrence of the QoS event based on the second QoS value and the first QoS value; and
   sending, to the session management function, an indication of the occurrence.

2. The method of claim 1, wherein the first QoS value and the second QoS value comprise at least one of:
   an end-to-end latency value;
   a jitter value;
   a survival time;
   a communication service availability;
   a reliability value; or
   a user experienced data rate.

3. The method of claim 1, wherein:
   the first QoS value is a latency value; and
   the second QoS value is a packet transmission latency of the data flow.

4. The method of claim 1, wherein the session management function receives, from a policy control function, a first message requesting to subscribe to the QoS event for the data flow, wherein the first message comprises:
   the QoS event; and
   the first QoS value for the QoS event.

5. The method of claim 1, wherein the session management function sends, to an access and mobility management function, a first message subscribing to the QoS event for the data flow, wherein the first message comprises:
   the QoS event; and
   the first QoS value.

6. The method of claim 5, wherein the access and mobility management function sends, to the base station, a second message comprising at least one information element of the first message.

7. The method of claim 1, further comprising receiving, by the session management function from a policy control function, a request to subscribe to the QoS event for the data flow, wherein request to subscribe to the QoS event comprises:
   an indication of the QoS event; and
   an indication of QoS values comprising an end-to-end latency.

8. The method of claim 1, further comprising receiving, by a policy control function from an application function, a request to subscribe to the QoS event for the data flow, wherein request to subscribe to the QoS event comprises:
an indication of the QoS event; and
an indication of QoS values comprising an end-to-end latency.

9. The method of claim 1, further comprising by sending, by the user plane function, monitoring packets to a base station to monitor latency between the user plane function and a base station.

10. The method of claim 1, further comprising by sending, by the user plane function, monitoring packets to a wireless device to monitor packet transmission latency between a base station and the wireless device.

11. A network device comprising:
one or more processors; and
memory storing instructions for a user plane function that, when executed by the one or more processors, cause the network device to:
receiving, from a session management function, a request for at least one quality of service (QoS) report for a data flow, the request indicating:
a QoS event; and
a first QoS value for the QoS event;
sending, to a base station, monitoring packets for monitoring a second QoS value of the data flow;
determining an occurrence of the QoS event based on the second QoS value and the first QoS value; and
sending, to the session management function, an indication of the occurrence.

12. The network device of claim 11, wherein the first QoS value and the second QoS value comprise at least one of:
an end-to-end latency value;
a jitter value;
a survival time;
a communication service availability;
a reliability value; or
a user experienced data rate.

13. The network device of claim 11, wherein:
the first QoS value is a latency value; and
the second QoS value is a packet transmission latency of the data flow.

14. The network device of claim 11, wherein the session management function receives, from a policy control function, a first message requesting to subscribe to the QoS event for the data flow, wherein the first message comprises:
the QoS event; and
the first QoS value for the QoS event.

15. The network device of claim 11, wherein the session management function sends, to an access and mobility management function, a first message subscribing to the QoS event for the data flow, wherein the first message comprises:
the QoS event; and
the first QoS value.

16. The network device of claim 15, wherein the access and mobility management function sends, to the base station, a second message comprising at least one information element of the first message.

17. The network device of claim 11, further comprising receiving, by the session management function from a policy control function, a request to subscribe to the QoS event for the data flow, wherein request to subscribe to the QoS event comprises:
an indication of the QoS event; and
an indication of QoS values comprising an end-to-end latency.

18. The network device of claim 11, further comprising receiving, by a policy control function from an application function, a request to subscribe to the QoS event for the data flow, wherein request to subscribe to the QoS event comprises:
an indication of the QoS event; and
an indication of QoS values comprising an end-to-end latency.

19. The network device of claim 11, wherein the instructions, when executed by the one or more processors, further cause the user plane function to send monitoring packets to a base station to monitor latency between the user plane function and a base station.

20. A system comprising:
a base station;
a session management function; and
a wireless network device comprising:
one or more processors; and
memory storing instructions that, when executed by the one or more processors, cause a user plane function to:
receiving, from a session management function, a request for at least one quality of service (QoS) report for a data flow, the request indicating:
a QoS event; and
a first QoS value for the QoS event;
sending, to a base station, monitoring packets for monitoring a second QoS value of the data flow;
determining an occurrence of the QoS event based on the second QoS value and the first QoS value; and
sending, to the session management function, an indication of the occurrence.

* * * * *